United States Patent
Hrastnik

(10) Patent No.: US 11,907,247 B2
(45) Date of Patent: *Feb. 20, 2024

(54) METADATA HUB FOR METADATA MODELS OF DATABASE OBJECTS

(71) Applicant: SAP SE, Walldorf (DE)

(72) Inventor: Jan Hrastnik, Sandhausen (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/678,741

(22) Filed: Feb. 23, 2022

(65) Prior Publication Data

US 2022/0179876 A1 Jun. 9, 2022

Related U.S. Application Data

(63) Continuation of application No. 16/387,983, filed on Apr. 18, 2019, now Pat. No. 11,294,927.

(51) Int. Cl.
| | |
|---|---|
| *G06F 16/00* | (2019.01) |
| *G06F 16/25* | (2019.01) |
| *G06F 16/28* | (2019.01) |
| *G06F 16/245* | (2019.01) |
| *G06F 16/22* | (2019.01) |

(52) U.S. Cl.
CPC ........ *G06F 16/258* (2019.01); *G06F 16/2282* (2019.01); *G06F 16/245* (2019.01); *G06F 16/284* (2019.01)

(58) Field of Classification Search
None
See application file for complete search history.

(56) References Cited

U.S. PATENT DOCUMENTS

| | | | |
|---|---|---|---|
| 10,127,365 B2 | 11/2018 | Kauerauf et al. | |
| 10,339,040 B2 | 7/2019 | Devpura et al. | |
| 2002/0169781 A1 | 11/2002 | Poole et al. | |
| 2004/0210607 A1* | 10/2004 | Manchanda | G06F 16/283 |
| 2006/0200438 A1* | 9/2006 | Schloming | G06F 16/284 |
| 2010/0042978 A1 | 2/2010 | Bird et al. | |
| 2013/0179474 A1 | 7/2013 | Charlet et al. | |

(Continued)

OTHER PUBLICATIONS

U.S. Appl. No. 16/387,983, filed Apr. 18, 2019, Hrastnik et al.

(Continued)

*Primary Examiner* — Anhtai V Tran
(74) *Attorney, Agent, or Firm* — Klarquist Sparkman, LLP

(57) ABSTRACT

Techniques and solutions are described for storing and processing metadata models using a metadata hub that can be accessed by a plurality of computing systems. The metadata hub can receive requests to retrieve or store metadata models. The metadata models can be converted between first and second formats. In some cases, the second format can be a relational format, such as a representation of a metadata model as one or more records in one or more database tables. The metadata hub can be used to compare metadata models, including comparing a metadata model provided by a client system with one or more metadata models stored in a repository maintained by the metadata hub. In at least some cases, the metadata model provided by the client system is not stored. The repository can be queried to find related metadata models, or to find metadata models meeting specified search criteria.

20 Claims, 22 Drawing Sheets

(56) References Cited

U.S. PATENT DOCUMENTS

| | | |
|---|---|---|
| 2017/0017709 A1 | 1/2017 | Sarferaz |
| 2017/0286456 A1 | 10/2017 | Wenzel et al. |
| 2018/0173520 A1 | 6/2018 | Golding et al. |
| 2019/0188297 A1 | 6/2019 | Goyal et al. |
| 2019/0197137 A1 | 6/2019 | Braud et al. |
| 2020/0334272 A1 | 10/2020 | Hrastnik et al. |
| 2021/0374146 A1 | 12/2021 | Hrastnik et al. |

OTHER PUBLICATIONS

ABAP CDS—cast_exp, https://help.sap.com/doc/abapdocu_751_index_htm/7.51/en-US/abencds_f1_cast_expression.htm, at least as early as Jun. 2, 2020, 4 pages.

CDS Annotations, SAP CDS, https://www.abaponhana.com/cds-annotations/, at least as early as Jun. 2, 2020, 8 pages.

Keller, "ABAP News for Release 7.51—ABAP CDS Client Handling," SAP, https://blogs.sap.com/2016/10/28/abap-news-release-7.51-abap-cds-client-handling/, Oct. 28, 2016, 7 pages.

CDS Part 15. Associations in CDS Views—1, https://sapyard.com/cds-part-15-associations-in-cds-views-i/, Feb. 21, 2019, 21 pages.

Compounding in CDS, https://wiki.scn.sap.com/wiki/display/BI/Compounding+in+CDS, a version of which was accessed at least as early as Jun. 2, 2020, Aug. 5, 2020, 3 pages.

Technical Overview of CDS View for ABAPPer—Part II, https://www2.slideshare.net/AshishSaxena15/technical-overview-of-cds-view-for-abaper-part-ii , at least as early as Jun. 2, 2020, 4 pages.

Core Data Services for ABAP, https://s3-eu-west-1.amazonaws.com/gxmedia.galileo-press.de/leseproben/4822/reading_sample_sappress_1798_coredataservicesforabap.pdf, chapter 6, May 29, 2019, 33 pages.

Non-Final Office Action received in U.S. Appl. No. 16/387,983, dated Sep. 1, 2021, 12 pages.

Non-Final Office Action received in U.S. Appl. No. 16/890,892, dated Sep. 30, 2021, 12 pages.

Notice of Allowance received in U.S. Appl. No. 16/387,983, dated Jan. 5, 2022, 10 pages.

Notice of Allowance received in U.S. Appl. No. 16/890,892, dated Feb. 1, 2022, 11 pages.

* cited by examiner

```
@AbapCatalog.sqlViewName: 'ISAMPLESO'
@EndUserText.label: 'Sample Sales Order'
@ObjectModel.compositionRoot: true
@ObjectModel.representativeKey: 'SalesOrder'
@Analytics.dataCategory: #DIMENSION
@AccessControl.authorizationCheck: #CHECK
@Metadata.allowExtensions: true
@Search.searchable: true
define view I_SampleSalesOrder
  as select from    vbak
  left outer to one join vbkd on  vbak.vbeln = vbkd.vbeln
                              and vbkd.posnr = '000000'
  association [0..*] to I_SampleSalesOrderItem as _Item
    on $projection.SalesOrder = _Item.SalesOrder
  association [0..1] to I_SampleCurrency as _TransactionCurrency
    on $projection.TransactionCurrency = _TransactionCurrency.Currency
  association [0..1] to I_SampleCustomer      as _SoldToParty
    on $projection.SoldToParty = _SoldToParty.Customer
{
  @Search.defaultSearchElement: true
  key cast(vbak.vbeln as vdm_sales_order preserving type) as SalesOrder,
  @ObjectModel.association.type: [#TO_COMPOSITION_CHILD]       //Composition
  _Item,
  vbak.vkorg                             as SalesOrganization,
  vbak.auart                             as SalesOrderType,
  vbak.vtweg                             as DistributionChannel,
  @ObjectModel.foreignKey.association: '_SoldToParty'
  vbak.kunnr                             as SoldToParty,
  _SoldToParty,
  @DefaultAggregation: #SUM
  @Semantics.amount.currencyCode: 'TransactionCurrency'
  vbak.netwr                             as TotalNetAmount,
  @Semantics.currencyCode: true
  @ObjectModel.foreignKey.association: '_TransactionCurrency'
  vbak.waerk                             as TransactionCurrency,
  _TransactionCurrency,
  ...
}
where vbak.vbtyp = 'C';
```

FIG. 5

```
@AbapCatalog.sqlViewName: 'ISAMPLESO'
@EndUserText.label: 'Sample Sales Order'
@ObjectModel.compositionRoot: true
@ObjectModel.representativeKey: 'SalesOrder'
@Analytics.dataCategory: #DIMENSION
@AccessControl.authorizationCheck: #CHECK
@Metadata.allowExtensions: true
@Search.searchable: true
define view I_SampleSalesOrder
  as select from      vbak
    left outer to one join vbkd on  vbak.vbeln = vbkd.vbeln
                                and vbkd.posnr = '000000'
  association [0..*] to I_SampleSalesOrderItem as _Item
    on $projection.SalesOrder = _Item.SalesOrder
  association [0..1] to I_SampleCurrency as _TransactionCurrency
    on $projection.TransactionCurrency = _TransactionCurrency.Currency
  association [0..1] to I_SampleCustomer         as _SoldToParty
    on $projection.SoldToParty = _SoldToParty.Customer
{
  @Search.defaultSearchElement: true
  key cast(vbak.vbeln as vdm_sales_order_preserving_type) as SalesOrder,
  @ObjectModel.association.type: [#TO_COMPOSITION_CHILD]     //Composition
  _Item,
  vbak.vkorg                                       as SalesOrganization,
  vbak.auart                                       as SalesOrderType,
  vbak.vtweg                                       as DistributionChannel,
  @ObjectModel.foreignKey.association: '_SoldToParty'
  vbak.kunnr                                       as SoldToParty,
  _SoldToParty,
  @DefaultAggregation: #SUM
  @Semantics.amount.currencyCode: 'TransactionCurrency'
  vbak.netwr                                       as TotalNetAmount,
  @Semantics.currencyCode: true
  @ObjectModel.foreignKey.association: '_TransactionCurrency'
  vbak.waerk                                       as TransactionCurrency,
  _TransactionCurrency,
  ...
}
where vbak.vbtyp = 'C';
```

← 604

608 →
```
@EndUserText.label: 'Auto assigned role for I_SampleSalesOrder'
@MappingRole: true
define role I_SampleSalesOrder {
  grant select on I_SampleSalesOrder
  where ( SalesOrderType ) =
  aspect pfcg_auth ( v_vbak_aat,
                     auart,
                     actvt = '03' );
}
```

612 →
```
@Metadata.layer: #CORE
annotate view I_SampleSalesOrder
with
{
  @UI.lineItem: [{importance: #HIGH }]
  SalesOrder;
  @UI.lineItem: [{importance: #HIGH }]
  SalesOrderType;
}
```

616 →
```
@AbapCatalog.sqlViewAppendName: 'XINSAMPLEISO'
@EndUserText.label: 'Sales Order Extension India'
extend view I_SampleSalesOrder with X_IN_I_SampleSalesorder
{
  _SoldToParty.CustomerClassification
}
```

System Software Versions 876

| SystemID | SystemSoftwareVersionID | SystemSoftwareVersionStartDateTime | ... |
|---|---|---|---|
| SAP:SYSTEM1 | 1 | 20190101080703 | ... |
| SAP:SYSTEM2 | 2 | 20190102080703 | ... |

854

Software Component Versions 882

| SoftwareComponentVersionID | SoftwareComponentID | SoftwareComponentReleaseID | SoftwareComponentSupportPackageID | ... |
|---|---|---|---|---|
| 11 | S4CORE | 102 | 2 | ... |
| 12 | SAP_BASIS | 752 | 2 | ... |
| 24 | S4CORE | 102 | 3 | ... |
| 25 | SAP_BASIS | 752 | 3 | ... |

856

Software Versions 872

| SystemSoftwareVersionID | SoftwareComponentVersionID | ... |
|---|---|---|
| 1 | 11 | ... |
| 2 | 12 | ... |
| 2 | 24 | ... |
| 2 | 25 | ... |

852

Assignments of Object Versions to Software Components 860

| SoftwareComponentVersionID | ObjectType | ObjectName | ObjectVersionID | PreviousObjectVersionID | ObjectDeletionDateTime | ... |
|---|---|---|---|---|---|---|
| 11 | DDLS | DDLS1 | 123 | | | ... |
| 11 | DDLS | DDLS2 | 788 | | | ... |
| 24 | DDLS | DDLS1 | 123 | | | ... |
| 24 | DDLS | DDLS1 | 788 | | | ... |
| 24 | DDLS | DDLS2 | 789 | 788 | 20190413080703 | ... |

850

Select Statements 1004

| Object Type | Object Name | Object VersionID | EntityName | PrimaryData SourceName | PrimaryData SourceType | WhereCondition CollectionID | JoinCondition CollectionID | ... |
|---|---|---|---|---|---|---|---|---|
| DDLS | DDLS1 | 56 | VIEW1 | TABLE1 | TABLE | | | |
| DDLS | DDLS2 | 77 | VIEW2 | TABLE2 | TABLE | | | |
| DDLS | DDLS3 | 88 | VIEW3 | TABLE3 | TABLE | 1 | | |
| DDLS | DDLS4 | 255 | VIEW4 | VIEW1 | VIEW | | 1 | |

Association Definition 1032

| Object Type | Object Name | Object VersionID | Entity Name | Association Name | Association OriginalName | Target Entity Name | Target Entity Type | Target Minimum Cardinality | Target Maximum Cardinality | OnCondition CollectionID | ... |
|---|---|---|---|---|---|---|---|---|---|---|---|
| DDLS | DDLS2 | 77 | VIEW2 | _V2 | _V2 | VIEW3 | VIEW | 0 | 1 | 1 | |

Conditions 1052

| Object Type | Object Name | Object VersionID | Condition Collection ID | Group ID | Grouping Ordinal Number | Grouping Operator | Left Group ID | Left Data Source Name | Left Field Name | Left Value | LeftToRight Relation | Right Group ID | Right Data Source Name | Right Field Name | Right Value | ... |
|---|---|---|---|---|---|---|---|---|---|---|---|---|---|---|---|---|
| DDLS | DDLS4 | 255 | 1 | 1 | | | | VIEW1 | | | LEFT_OUTER_JOIN | 2 | | | | |
| DDLS | DDLS4 | 255 | 1 | 2 | 1 | | | VIEW2 | FIELD2 | | EQUAL | | VIEW1 | FIELD2 | | |
| DDLS | DDLS4 | 255 | 1 | 2 | 2 | AND | | TABLE3 | FIELD3 | | NOT_EQUAL | | | | REL | |
| DDLS | DDLS3 | 88 | 1 | | | | | VIEW2 | FIELD4 | | EQUAL | | VIEW3 | VIEW3 | X | |
| DDLS | DDLS2 | 77 | | | 1 | | | | FIELD3 | | | | | | | |

FIG. 10

DDLS2

```
define view View2                                    1104
  as select from View1
  {                                    1120
    key View1.Field1 as AliasedField1,
    case View1.Field2
      when 'VAL1' then 'X'
      when 'VAL2' then 'Y'
      else 'Z'                 1122
    end as CalculatedField2,                    1124
    concat( View1.Field1, View1.Field2) as CalculatedField3,
    cast( View1.Field3 as DE4 preserving type ) as CalculatedField4
  }
                                                              1126
```

DDLS1

```
                            1108
  define view View1
    as select from Table1
    {                       1130
      key Table1.Field1,
          Table1.Field2,
          Table1.Field3   1132
    }    1134
```

TABLE1

```
                         1112
  define table Table1
  {         1140
    key Field1 : DE1 not null;
       Field2 : DE2;
  1142  Field3 : DE3;
    }      1144
```

FIG. 11

| 1202 Object Type | 1204 Object Name | 1206 Object Version ID | 1208 Entity Name | 1210 Field Name | 1212 Field Original Name | 1214 Base Entity Name | 1216 Base Entity Type | 1218 Base Field Name | 1220 Base Expression ID | 1222 IsKey Field | 1224 Data Element | 1226 Data Type | 1228 Data Type Length |
|---|---|---|---|---|---|---|---|---|---|---|---|---|---|
| DDLS | DDLS1 | 13 | VIEW1 | FIELD1 | Field1 | TABLE1 | TABL | FIELD1 | | TRUE | DE1 | CHAR | 30 |
| DDLS | DDLS1 | 13 | VIEW1 | FIELD2 | Field2 | TABLE1 | TABL | FIELD2 | | | DE2 | CHAR | 10 |
| DDLS | DDLS1 | 13 | VIEW1 | FIELD3 | Field3 | TABLE1 | TABL | FIELD3 | | | DE3 | CHAR | 20 |
| DDLS | DDLS2 | 65 | VIEW2 | ALIASEDFIELD1 | AliasedField1 | VIEW1 | VIEW | FIELD1 | | TRUE | DE1 | CHAR | 30 |
| DDLS | DDLS2 | 65 | VIEW2 | CALCULATEDFIELD2 | CalculatedField2 | | | | 1 | | | CHAR | 4 |
| DDLS | DDLS2 | 65 | VIEW2 | CALCULATEDFIELD3 | CalculatedField3 | | | | 2 | | | CHAR | 40 |
| DDLS | DDLS2 | 65 | VIEW2 | CALCULATEDFIELD4 | CalculatedField4 | VIEW1 | VIEW | FIELD3 | | | DE4 | CHAR | 20 |
| TABL | TABLE1 | 24 | TABLE1 | FIELD1 | | | | | | TRUE | DE1 | CHAR | 30 |
| TABL | TABLE1 | 24 | TABLE1 | FIELD2 | | | | | | | DE2 | CHAR | 10 |
| TABL | TABLE1 | 24 | TABLE1 | FIELD3 | | | | | | | DE3 | CHAR | 20 |

1200

1250 (first group) 1252 (second group)

| 1230 Data Type Decimals | 1232 Field Definition StartLine | 1234 Field Definition StartColumn | 1236 Field Definition EndLine | 1238 Field Definition EndColumn | 1240 |
|---|---|---|---|---|---|
| ... | ... | ... | ... | ... | ... |
| | 4 | 2 | 4 | 35 | ... |
| | 5 | 2 | 9 | 25 | ... |
| | 10 | 2 | 10 | 57 | ... |
| | 11 | 2 | 11 | 65 | ... |
| ... | ... | ... | ... | ... | ... |

FIG. 12

| Object Type | Object Name | Object Version ID | Entity Name | SubEntity Name | Annotation InternalID | Annotation Name | Parent Annotation InternalID | AnnotationValue | Effective AnnotationValue |
|---|---|---|---|---|---|---|---|---|---|
| DDLS | DDLS2 | 312 | VIEW2 | KEYFIELD | 1 | ENDUSERTEXT | | | |
| DDLS | DDLS2 | 312 | VIEW2 | KEYFIELD | 2 | ENDUSERTEXT.LABEL | 1 | View2: Label text in English | LOCALIZED_TEXT:456 |
| DDLS | DDLS1 | 217 | VIEW1 | KEYFIELD | 1 | ENDUSERTEXT | | | |
| DDLS | DDLS1 | 217 | VIEW1 | KEYFIELD | 2 | ENDUSERTEXT.LABEL | 1 | View1: Label text in English | LOCALIZED_TEXT:135 |
| DDLS | DDLS1 | 217 | VIEW1 | KEYFIELD | 3 | ENDUSERTEXT.QUICKINFO | 1 | View1: Quickinfo text in English | LOCALIZED_TEXT:249 |
| DDLX | DDLX2 | 672 | VIEW2 | KEYFIELD | 1 | SEARCH | | | |
| DDLX | DDLX2 | 672 | VIEW2 | KEYFIELD | 2 | SEARCH.DEFAULTSEARCHELEMENT | 1 | | TRUE |

1400

| TextID | Language Code | Text |
|---|---|---|
| 135 | EN | View1: Label text in English |
| 135 | DE | View1: Bezeichnertext in Deutsch |
| 456 | EN | View2: Label text in English |
| 456 | DE | View2: Bezeichnertext in Deutsch |
| 249 | EN | View1: Quickinfo text in English |
| 249 | DE | View1: Schnellinfotext in Deutsch |

Table 1500:

| Object Type 1504 | Object Name 1508 | Object Version ID 1510 | Active Annotation VersionID 1530 | Entity Name 1512 | SubEntity Name 1514 | Annotation InternalID 1516 | Annotation Name 1518 | Parent Annotation InternalID 1520 | AnnotationValue 1522 |
|---|---|---|---|---|---|---|---|---|---|
| DDLS | DDLS2 | 312 | 588 | VIEW2 | KEYFIELD | 1 | ENDUSERTEXT | | |
| DDLS | DDLS2 | 312 | 588 | VIEW2 | KEYFIELD | 2 | ENDUSERTEXT.LABEL | 1 | View2: Label text in English |
| DDLS | DDLS2 | 312 | 588 | VIEW2 | KEYFIELD | 3 | ENDUSERTEXT.QUICKINFO | 1 | View1: Quickinfo text in English |
| DDLS | DDLS2 | 312 | 588 | VIEW2 | KEYFIELD | 4 | SEARCH | | |
| DDLS | DDLS2 | 312 | 588 | VIEW2 | KEYFIELD | 5 | SEARCH.DEFAULTSEARCHELEMENT | 4 | |

| Effective AnnotationValue 1524 | AnnotationOrig ObjectType 1532 | AnnotationOrig ObjectName 1534 | AnnotationOrigin ObjectVersionID 1536 |
|---|---|---|---|
| LOCALIZED_TEXT:456 | DDLS | DDLS2 | 312 |
| | DDLS | DDLS2 | 312 |
| LOCALIZED_TEXT:249 | DDLS | DDLS1 | 217 |
| | DDLX | DDLX2 | 672 |
| | DDLX | DDLX2 | 672 |
| ... | ... | ... | ... |

FIG. 15

1712 ObjectVersionSource  1714  1716

1704

| ObjectType | ObjectName | ObjectVersionId | ... |
|---|---|---|---|
| DDLS | I_CUSTOMER | 1 | ... |
| DDLS | I_CUSTOMER | 2 | ... |
| DDLS | I_CUSTOMER | 3 | ... |
| DDLS | I_CUSTOMER | 4 | ... |
| DDLS | I_CUSTOMER | 5 | ... |
| DDLS | I_SALESORDER | 1 | ... |
| DDLS | I_SALESORDER | 2 | ... |
| DDLS | I_SALESORDER | 3 | ... |
| DDLS | I_SALESORDERITEM | 1 | ... |

1708

DdlsVersion  1720  1722  1724  1726

| DdlsName | DdlsVersionID | CdsEntityName | CdsEntity OriginalName | ... |
|---|---|---|---|---|
| I_CUSTOMER | 1 | I_CUSTOMER | I_Customer | ... |
| I_CUSTOMER | 2 | I_CUSTOMER | I_Customer | ... |
| I_CUSTOMER | 3 | I_CUSTOMER | I_Customer | ... |
| I_CUSTOMER | 4 | I_CUSTOMER | I_Customer | ... |
| I_CUSTOMER | 5 | I_CUSTOMER | I_Customer | ... |
| I_SALESORDER | 1 | I_SALESORDER | I_SalesOrder | ... |
| I_SALESORDER | 2 | I_SALESORDER | I_SalesOrder | ... |
| I_SALESORDER | 3 | I_SALESORDER | I_SalesOrder | ... |
| I_SALESORDERITEM | 1 | I_SALESORDERITEM | I_SalesOrderItem | ... |

FIG. 17

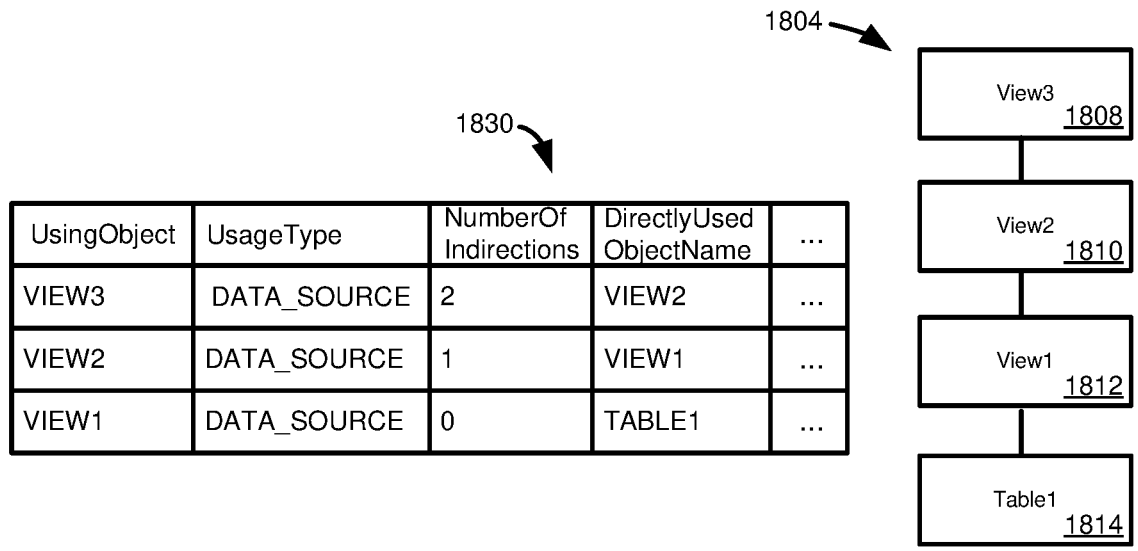

FIG. 18

```
<Annotations xmlns="http://docs.oasis-open.org/odata/ns/edm" Target=".../FieldName">
  <Annotation Term="Common.ValueList">
    <Record>
      <PropertyValue String="FieldName" Property="Label"/>
      <PropertyValue String="Field" Property="CollectionPath"/>
      <PropertyValue Property="SearchSupported" Bool="true"/>
      <PropertyValue Property="Parameters">
        <Collection>
          <Record Type="Common.ValueListParameterInOut">
            <PropertyValue Property="LocalDataProperty" PropertyPath="FieldName"/>
            <PropertyValue String="FieldName" Property="ValueListProperty"/>
          </Record>
          <Record Type="Common.ValueListParameterDisplayOnly">
            ...
          </Record>
          ...
        </Collection>
      </PropertyValue>
    </Record>
  </Annotation>
</Annotations>
```

FIG. 19

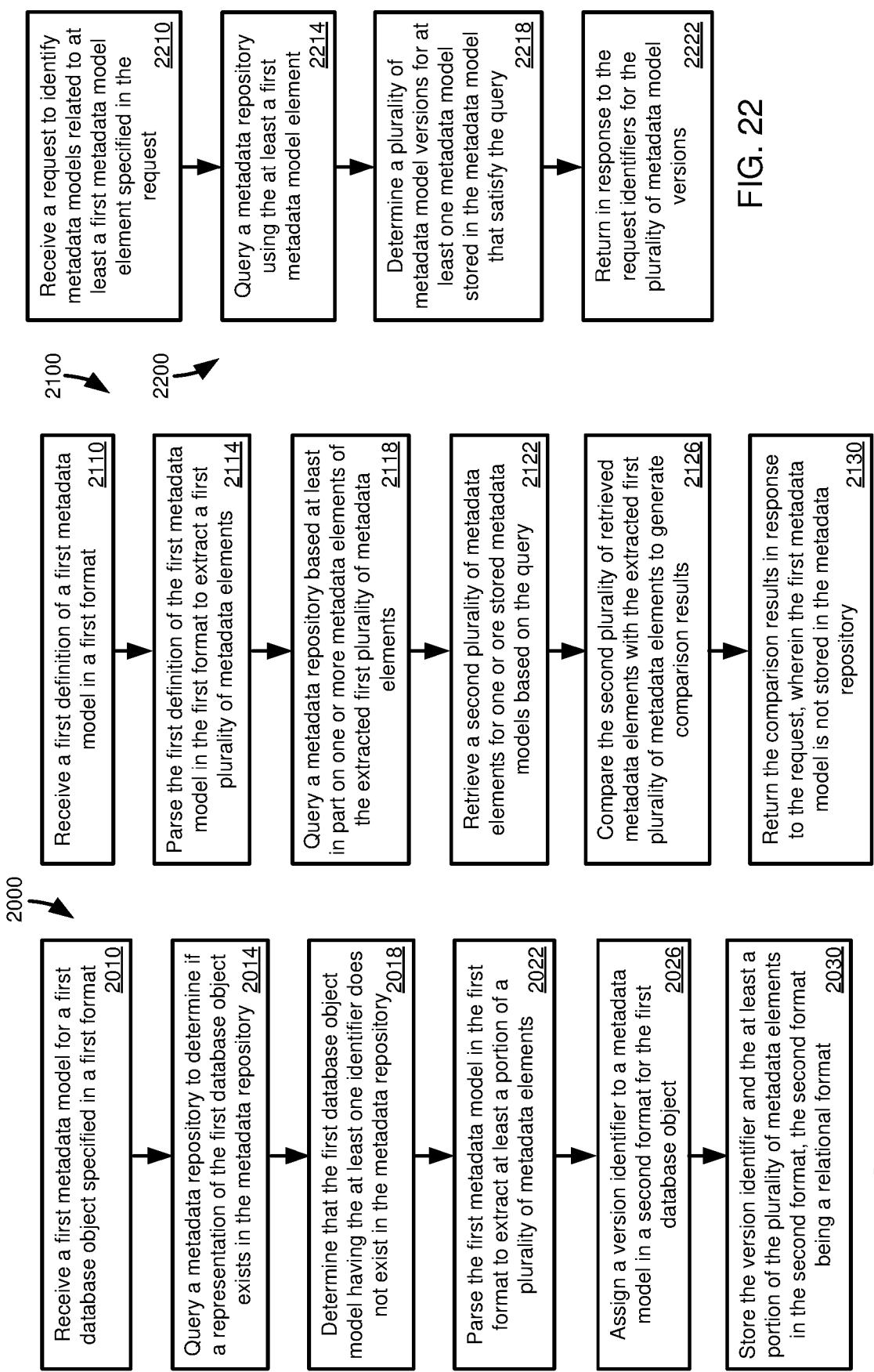

METADATA HUB FOR METADATA MODELS OF DATABASE OBJECTS

CROSS REFERENCE TO RELATED APPLICATIONS

This application is a continuation of U.S. patent application Ser. No. 16/387,983, filed on Apr. 18, 2019, which is hereby incorporated herein by reference.

FIELD

The present disclosure generally relates to metadata models for database objects. Particular implementations provide a central metadata hub that can be used to retrieve, store, and compare metadata models, including storing metadata models in a relational format.

BACKGROUND

Ever increasing amounts of data are becoming available, from an increasing variety of sources. Data associated with a specific purpose, such as a specific analog-world entity, is typically associated with metadata that describes that data. For example, a ten-digit integer might be data, but without metadata, it may be difficult to know what that ten-digit integer represents—a phone number, a driver's license number, a password, etc. Thus, using and making "sense" of data can be highly dependent on having the correct metadata to provide context to the data.

A database or other data source associated with a complex endeavor, such as the operation of a business entity, can involve thousands of table types, and billions of records. Adding to the complexity, tables or other database objects can reference each other. A change to one object can thus affect many other objects, such as rendering them unusable, or potentially worse, useable but incorrect. This problem can be yet further compounded when multiple entities may access a set of metadata definitions, or schemas, for the objects, but may have different use cases, use different combinations of schemas, use different software or schema versions, etc. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for storing and processing metadata models using a metadata hub that can be accessed by a plurality of computing systems. The metadata hub can receive requests to retrieve or store metadata models. The metadata models can be converted between first and second formats. In some cases, the second format can be a relational format, such as a representation of a metadata model as one or more records in one or more database tables. The metadata hub can be used to compare metadata models, including comparing a metadata model provided by a client system with one or more metadata models stored in a repository maintained by the metadata hub. In at least some cases, the metadata model provided by the client system is not stored. The repository can be queried to find related metadata models, or to find metadata models meeting specified search criteria.

In one embodiment, a method is provided that can be carried out by a metadata hub to store a representation of a metadata model of a database object. A first metadata model specified in a first format for a first database object is received. The first format includes a plurality of metadata elements, the plurality of metadata elements including at least one identifier of the first database object. A metadata repository is queried to determine if a representation of the first database object exists in the metadata repository. It is determined that the first database object having the at least one identifier does not exist in the metadata repository. The metadata model in the first format is parsed to extract at least a portion of the plurality of metadata elements. A version identifier is assigned to a metadata model in a second format for the first database object. The version identifier and the at least a portion of the metadata elements are stored in the second format, the second format being a relational format.

In another aspect, operations can be carried out to identify related database metadata models. A request is received to identify metadata models related to at least a first metadata model element specified in the request. A metadata repository is queried using the at least a first metadata model element. The metadata repository includes a plurality of metadata models, at least a portion of the metadata models representing different versions of a given metadata model. A plurality of metadata model versions for at least one metadata model stored in the metadata model repository that satisfy the query are determined. Identifiers for the plurality of metadata model versions are returned in response to the request.

In a further aspect, operations can be carried out to compare metadata models. A first definition of a first metadata model in a first format is received. The first definition of the first metadata model in the first format is parsed to extract a first plurality of metadata elements. A metadata repository is queried based at least in part on one of more metadata elements of the extracted first plurality of metadata elements. A second plurality of metadata elements are retrieved for one or more stored metadata models based on the query. The second plurality of retrieved metadata elements are compared with the extracted first plurality of metadata elements to generate comparison results. The comparison results are returned in response to the request. The second metadata model is not stored in the metadata repository.

The present disclosure also includes computing systems and tangible, non-transitory computer readable storage media configured to carry out, or including instructions for carrying out, an above-described method (or operations). As described herein, a variety of other features and advantages can be incorporated into the technologies as desired.

BRIEF DESCRIPTION OF THE DRAWINGS

FIG. 5 is code for an example metadata model for a database view.

FIG. 6 is code for an example metadata model for a database view, and for metadata models which modify or refer to such example metadata model.

FIGS. 8A and 8B are example tables illustrating how metadata models can be stored in a relational format.

FIG. 10 provides example database tables illustrating how metadata model information presented in FIG. 9 can be stored in a relational format.

FIG. 11 is a schematic diagram illustrating how metadata models can have fields that are defined with respect to other metadata models.

FIG. 12 provides an example database table illustrating how metadata model information presented in FIG. 11 can be stored in a relational format.

FIGS. 14 and 15 provide example database tables illustrating how metadata model information presented in FIG. 13 can be stored in a relational format.

FIGS. 17 and 18 present example tables that can be used to carry out operations requested through a data access service.

FIG. 19 presents example code that can be used to annotate a user interface service displaying metadata model information.

FIGS. 20-22 are flowcharts illustrating various embodiments of disclosed innovations, which embodiments include operations for storing, comparing, or searching metadata models for database objects.

DETAILED DESCRIPTION

Example 1

Overview

Figure 1:
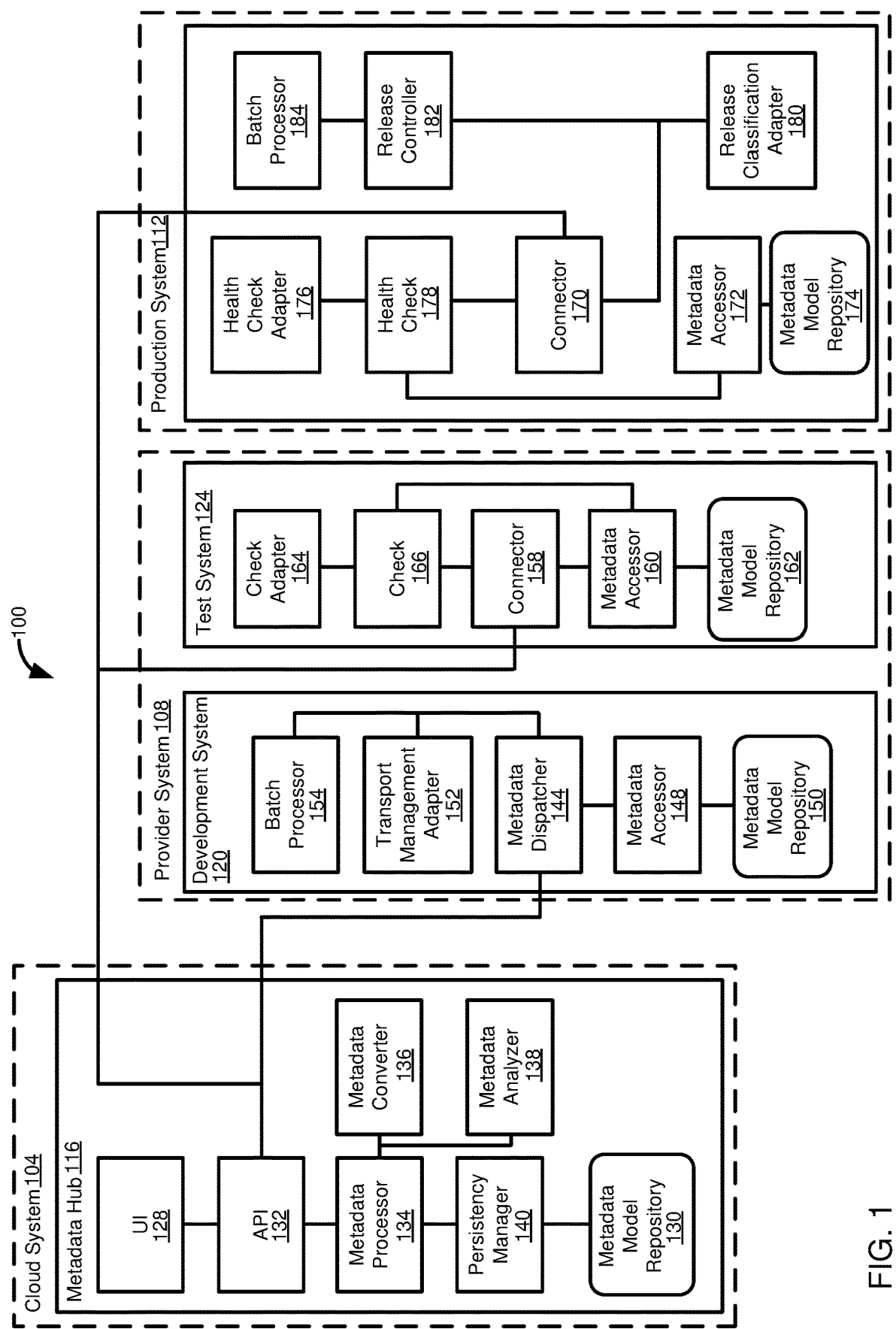
FIG. 1 is a diagram illustrating an example computing environment having a metadata hub in which disclosed embodiments can be implemented.

Ever increasing amounts of data are becoming available, from an increasing variety of sources. Data associated with a specific purpose, such as a specific analog-world entity, is typically associated with metadata that describes that data. For example, a ten-digit integer might be data, but without metadata, it may be difficult to know what that ten-digit integer represents—a phone number, a driver's license number, a password, etc. Thus, using and making "sense" of data can be highly dependent on having the correct metadata to provide context to the data.

A database or other data source associated with a complex endeavor, such as the operation of a business entity, can involve thousands of table types, and billions of records. Adding to the complexity, tables or other database objects can reference each other. A change to one object can thus affect many other objects, such as rendering them unusable, or potentially worse, useable but incorrect. This problem can be yet further compounded when multiple entities may access a set of metadata definitions, or schemas, for the objects, but may have different use cases, use different combinations of schemas, use different software or schema versions, etc. Accordingly, room for improvement exists.

Disclosed technologies can improve various aspects of metadata storage and management. In particular, disclosed technologies can include a central metadata hub than can be used to store metadata models, or schema. The central metadata hub can service requests from client systems, such as to store or retrieve metadata models, or to evaluate metadata models, such as to determine interdependent models, to determine the effect of a change in a metadata model (e.g., the effect on any interdependent models), or to compare metadata models, such as to determine differences between two versions of a metadata model.

To facilitate storage, retrieval, and comparison of models, models can be converted between representations. For example, a model can be converted between a string or string-like representation (e.g., a string holding the text of a SQL query) and a structured representation, such as a programming language (including a markup language) representation (e.g., an instance of a complex, composite, or abstract data type, such as an instance of a class) or a platform independent, but structured, format. For example, a string representation can be SQL DDL statements for defining database objects such as tables and views. The string can be parsed to generate a structured representation.

A structured representation can be a representation of these statements in a relational format, such as in one or more tables. For example, an entity (table) can store definitions of table fields and another entity (table) can store features like WHERE and JOIN conditions. Structured formats can also include formats such as XML, JSON, or CSON (Core Schema Object Notation, of SAP, SE, of Walldorf, Germany). However, in some cases, format conversion can include converting between different structured formats, such as from a structured format such as XML, CSON, or JSON to a relational format, or vice versa.

Disclosed technologies can also include augmenting a metadata model, such as a particular version of a metadata model, with information from logically related metadata models. That is, for example, a first version of a SQL VIEW may reference a first version of a first database table. If the first database table is changed to a second version (such as one that does not include an attribute that was in the first version, or an attribute having a changed datatype), a coherent version of the first version of the SQL VIEW may no longer exist. Thus, the present disclosure can store data models such that a coherent (e.g., useable) metadata model can be constructed, including the original versions of any referenced/logically related metadata models.

The central metadata hub can be independent of applications, including database management systems, which can access the hub. Thus, if a particular application is removed, or updated to a new version, data stored in the central metadata hub for that application can be retained. Being independent of particular applications can also allow stored metadata models to be viewed by users who do not have access to those particular applications or systems, including for evaluating whether/how to deploy such applications, to develop new applications, or to deploy a different application that might use metadata models that exist for other applications (which can, for example, save development work by not having to reconstruct existing models, or to reduce errors that might result from metadata models that are not completely compatible).

Client systems can be modified to help integrate with, and maintain the integrity of, the central metadata hub. For example, applications (including a DBMS) executing on a client system can be configured to automatically send changes in metadata models to the metadata hub. These changes can be sent as they occur/in real time, or can be sent periodically, including batching changes together. For example, a database system (or an environment that includes a database system) may include a transport function or system whereby changes made to the system, such as by an application developer or a database administrator, are propagated from a development or test environment to one or more production systems. The transport process can be modified to include a call to the central metadata hub to record any metadata model changes included in a particular transport.

Similarly, a test system or environment can be modified to access the central metadata hub. When a particular application or object is being tested, the test can include accessing the central metadata hub, such as to determine whether a change will affect, or be affected by, any dependent items stored in the metadata hub. In at least some cases, dependent objects might not be stored by/known to the test system.

The central metadata hub may also be used to improve applications, or to enable users to better use software applications. For example, first and second systems may use a particular metadata model. The first system may change the model, such as to add new features or to improve performance. By periodically consulting the central metadata hub, the second system can discover such changes, and thus the new features/improved performance made available at the second system, even if such improvements require user training or adapting the second system to use the improvements. Similarly, changes may be used to highlight problems that may exist at the second system, or to indicate that the second system is becoming out of date, and that the chance for problems occurring may be increasing as a result.

Example 2

Example Database Schema with Technical Relationships

FIG. 1 illustrates an example computing environment 100 in which disclosed technologies can be implemented. At a high level, the computing environment 100 includes a cloud system 104, a provider system 108, and a production system 112. The cloud system 104 can host a metadata hub 116. The provider system 108 can include a development system 120 and a test system 124.

The computing environment 100 is provided by way of example, and various changes can be made without departing from the scope of the present disclosure. For example, the metadata hub 116 need not be hosted on a cloud system, including being hosted in the provider system 108, such as being part of the development system 120 or the test system 124. Although a single production system 112 is shown, the computing environment 100 can include multiple production systems, all or a portion of which could be associated with different entities (for example, different customers of a service provider). In the case of a scenario with multiple production systems 112, the metadata hub 116 could be located at one of the production systems. Although various features of the disclosed technologies are described in conjunction with FIG. 1, and the Examples set forth herein, it should be appreciated that not all features need to be included in all implementations.

The cloud system 104 can include a user interface 128. The user interface 128 can be used to browse metadata models stored in a metadata model repository 130. Among other things, the user interface 128 may allow a user to browse versions of metadata models, and can highlight changes between metadata model versions, including showing one or more of added components, removed components, and changed components. The user interface 128 can provide search capabilities, including fuzzy search capabilities, so that a user can locate metadata models having particular properties (e.g., having fields, object names, etc., that match certain keywords or concepts). In some cases, metadata models can be associated with documentation, such as descriptions of model components, relationships between model components, or descriptions of how model components can be used. The user interface 128 can include links between a metadata model, or component, and any corresponding documentation.

In particular implementations, the user interface 128 can be used to access an API 132, where the API can also be accessed by other components of the architecture 100, including by components of the provider system 108 or the production system 112. In a particular example, the API can be REST-based, such as using the ODATA protocol. The API 132 can be used to call various features of the metadata hub 116, such as to retrieve a metadata model from the metadata model repository 130 or to store a metadata model in the metadata repository. In some cases, the API 132 can include functions that can be called to delete a metadata model from the metadata model repository 130 or to change a metadata model in the metadata repository. In other cases, the API 132 does not include these features, or the features are restricted to a particular user or group of users.

For example, as the metadata model repository 130 is intended to be a comprehensive store of many versions of many metadata models, it may be undesirable to remove a metadata model, either by removing the model completely or by overwriting aspects of a metadata model to conform with a different version of the metadata model. Typically, rather than changing a stored metadata model, changed metadata models are stored as new versions of the metadata model in the metadata model repository 130. Similarly, deletion of a metadata model can be represented in the metadata model repository 130, but does not result in a physical deletion of that metadata model (e.g., the deletion can be represented as a new version of the metadata model, and prior versions are not removed, but could, for example, be annotated to indicate that the model has been deleted or deprecated).

The API 132 can be used to call other functions of the metadata hub 116, such as to compare two or more versions of a metadata model. In the case of comparing metadata models, the models can be models that are stored in the metadata hub 116. Or, the call to the API 132 can include a metadata model to be stored in the metadata model repository 130, or to be compared without being stored in the metadata repository. Another API call 132 can be to determine related metadata models, or possible inconsistencies between metadata models, which metadata models can be metadata models stored in the metadata repository 130, metadata models provided in the call, or a combination thereof.

The API 132 can be in communication with a metadata processor 134. That is, for example, the API 132 can be used to call functions implemented/executed by the metadata processor 134. In some cases, these functions, or other functionality of the metadata processor 134, can be accessed in ways other than/in addition to the API 132. For example, the metadata processor 134 may be part of an application executing on the cloud system 104 that directly accesses functionality of the metadata processor 134.

In carrying out features of the disclosed technologies, the metadata processor 134 can communicate with a metadata converter 136, a metadata analyzer 138, and a persistency manager 140. The metadata converter 136 can be used to convert metadata models between formats, including between string or string-like formats and a structured format. In a particular example, the metadata converter 136 can be used to convert metadata models between a string representation, such a SQL statement, or platform independent, structured, representations, such as XML, CSON, or JSON, and a relational representation of the metadata model, such as a representation expressed as one or more records in one or more relational database tables. The relational database representation of the models can be stored by the persistency manager 140. When a request to store a model is received, the metadata processor 134 can cause the metadata converter 136 to convert the metadata model to records that can be inserted by the persistency manger 140 into the appropriate tables. When a request to receive a model is received, the persistency manager 140 can retrieve the appropriate records from the metadata model repository 130, such as using a SQL query. If appropriate based on the request, the metadata processor 134 can request the metadata converter 136 to convert the records to an appropriate format to respond to the request, such as converting the records to a SQL representation of the metadata model.

The metadata analyzer 138 can be used to implement features relating to evaluating a metadata model or comparing versions of metadata models. For example, the metadata analyzer 138 can compare two or more metadata models to determine portions that are the same, different, added, removed, have another relationship, or combinations thereof. The metadata analyzer 138 can determine whether metadata (including a change to the metadata) of a metadata model is consistent with metadata models that might be referenced by a given metadata model. In the case of a table, a change to the table can be used to determine whether objects that reference the table, such as one or more views, may be impacted by/are consistent with the change. Similarly, if a view 2 references a view 1, a change to view 1 can be analyzed to determine whether it is consistent with view 2.

The metadata analyzer 138 can carry out functions to improve metadata models, or to resolve potential issues regarding metadata models. For example, if a first metadata model is incompatible with the first version of a second metadata model referenced by the first metadata model, but would be compatible with a second version of the second metadata model, the metadata analyzer 138 can generate a recommendation to have the first metadata model reference the second version of the second metadata model. The recommendation might include sending the second version of the second metadata model in response to an API call that caused the comparison. Similarly, if two metadata models are incompatible, the metadata analyzer 138 can recommend changes to one or both of the models to provide compatibility.

The metadata analyzer 138 can also be programmed to analyze potential performance issues that might be associated with a metadata model, or a collection of metadata models (including metadata models that might be hierarchically related). For instance, if a first metadata model includes a SQL JOIN condition that references a second metadata model, the metadata analyzer 138 can determine whether another join condition, including referencing a different metadata model, might be more efficient for accomplishing the function of the join (e.g., by joining fewer tables, or by joining a table with a smaller number of records, which can reduce the time/computational effort to execute the join).

As discussed above, the persistency manger 140 can be used to store metadata model information in, or retrieve such information from, the metadata model repository 130, which can be a collection of relational database tables that store metadata model information, and can be used to reconstitute a metadata model in another format. In at least some implementations, in addition to storing a relational (e.g., table) representation of a metadata model, the persistency manger 140 can store another representation of a metadata model, such as a string representation (e.g., a SQL representation), or a CSON, JSON, or XML representation.

The development system 120 of the provider system 108 can include a metadata dispatcher 144. The metadata dispatcher 144 can be used to call the API 132, such as to cause metadata models to be stored in the metadata model repository 130, to retrieve metadata models from the metadata model repository, or to request other functions of the metadata processor 134 through the API. The metadata dispatcher 144 can be in communication with a metadata accessor 148, which can be used to store metadata models in, or retrieve metadata models from, a metadata model repository 150. The metadata model repository 150 can be, for example, a data dictionary (e.g., an ABAP data dictionary) or an information schema.

The development system 120 can include a transport manager adapter 152. The transport manager adapter 152 can call the metadata dispatcher 144 when a transport (e.g., an update to be installed on another system, where the update includes a metadata model, or a change to a metadata model) is released, such as to the production system 112 or the test system 124. Or, the metadata model, or metadata model changes, may be communicated to a batch processor 154. The batch processor 154 can periodically call the metadata dispatcher 144 to send metadata models or metadata model changes to the metadata hub 116.

The test system 124 can include a metadata connector 158 that can communicate with the metadata hub 116 through the API 132. The metadata connector 158 can call a metadata accessor 160 to access metadata stored in a metadata model repository 162, which components can be implemented at least generally as described for the development system 120. A check adapter 164 can communicate with a check component 166, which in turn can call the connector 158 and the metadata accessor 160. The check adapter 164 can be used to initiate calls to send metadata models, or changes to metadata models, to, or receive metadata models, or changes to metadata models, from, the metadata model repository 130. The check adapter 164 first calls the check component 166, which then can request the appropriate API call to be made by the connector 158. The check component 166 can request metadata models from the metadata repository 162, such as for performing a comparison by the check component, or having the metadata models sent to the API 132 by the connector 158, such as for the metadata analyzer 138 to conduct a consistency check. The check adapter 164 can also be used to integrate metadata checks, such as using the metadata hub 116, into an existing test framework, such as the ATC ABAP test cockpit of SAP SE of Walldorf, Germany.

The production system 112 can include a connector 170, a metadata accessor 172, and a metadata model repository 174, which can be implemented at least generally as described for the corresponding components of the provider system 108. A health check adapter 176 can call a health check component 178, which in turn can call the connector 170 to access the metadata hub 116 via the API 132. Health checks executed by the health check component 178 can include determining whether changes in one set of metadata models, such as models provided by a service provider, are consistent with another set of metadata models, which can be customer specific models. For example, customer metadata models may build on base metadata models provided by the service provider. If the base metadata models change, the usability or performance of the customer metadata models may be affected.

In some cases, customer metadata models are not stored in the metadata model repository 130, or are stored such that they are not co-mingled with models from other customers (e.g., the metadata model repository 130 is implemented in a multi-tenant manner). For example, to compare a customer specific metadata model with metadata models stored in the metadata model repository 130, the customer specific metadata model can be sent to the metadata hub 116 via the API 132. The metadata analyzer 138 can analyze the customer specific metadata model with respect to other metadata models, including those stored in the metadata model repository 130. Results of the comparison can be returned to the health check component 178, and eventually to the health check adapter 176, but the customer specific metadata model is not stored in the metadata model repository 130 or otherwise maintained in the cloud system 104. In some cases, the comparison results are also not stored on the cloud system 104.

A release classification adapter 180 can access the connector 170 and a release controller 182. The release classification adapter 180 can be used to determine whether updates received from another database system, such as the provider system 108, may cause issues with the environment of the production system 112, such as by interacting negatively with customer specific metadata models. If a problem is detected, the release classification adapter 180 can direct the release controller 182 to block all or a portion of the release until a correction for the issue is available. Or, if the correction becomes available and the issue is resolved, the release classification adapter 180 can direct the release controller 182 to implement the release. A batch processor 184 can be configured to periodically check for incompatibilities between the environment of the production system 112 and metadata models available in the metadata model repository 130.

Example 3

Example Table Elements Including Semantic Identifiers

Database systems typically include an information repository that stores information regarding a database schema. For instance, PostgreSQL includes an INFORMATION_SCHEMA that includes information regarding tables in a database system, and certain table components, such as attributes (or fields) and their associated datatypes (e.g., varchar, int, float). Other database systems, or query languages, include similar concepts. However, as described above, these types of repositories typically only store technical information regarding database components, not semantic information.

Other database systems, or applications or frameworks that operate using a database layer, may include repositories that store semantic information for data. For instance, SAP SE of Walldorf, Germany, provides the ABAP programming language which can be used in conjunction with database systems. ABAP provides the ability to develop database applications that are agnostic to the nature, including vendor, of the underlying relational database management system. In part, this ability is enabled using a data dictionary. The data dictionary can include at least some information that is similar to information that is maintained in an information schema. However, the data dictionary can include semantic information regarding data, and optionally additional technical information.

In addition, the data dictionary can include textual information regarding fields in a table, such as human-readable descriptions (sometimes in different languages, such as English, French, or German) of the purpose or use of the field. In at least some cases, the textual information can serve as semantic information to a computer. However, other types of semantic information need not necessarily be (at least easily) human-understandable, but can be easier for a computer to process than parsing textual information primary intended for human use. Data dictionaries can also contain or express relations between data dictionary objects through various properties (which can be reflected in metadata), such as having the data dictionary reflect that dictionary objects are assigned to packages, and thus having a relationship to one another through a package assignment.

As used herein, "technical information" (or technical metadata) relates to information that describes data as data, which is information such as a type that can be used to interpret a value of the data, and which can influence how the data is processed. For instance, the value "6453" could be interpreted (or cast) as an integer, a float, a string, or an array of characters, among various possibilities. A value may be processed differently, in some cases, depending on whether it is a number, such as an integer or a float, or whether it is treated as a collection of characters. Similarly, technical information can specify acceptable values for data, such as a length or a number of decimal places that are allowed. The technical information can specify properties of the data without concern regarding what the data represents or "means." Of course, however, a designer of a database system can select particular technical properties for particular data knowing themselves the semantic properties of the data—e.g., "If I intend to have a value representing a person's name, I should use a string or array of characters rather than a float." On the other hand, in at least some cases, data types might be a type that would not be expected by a database administrator or user. For instance, rather than using a person's name to identify data associated with the person, a separate numerical or alphanumerical identifier might be used, which might be counter intuitive based on the "meaning" of the data (e.g., "I do not consider myself to be a number").

As used herein, "semantic information" (or semantic metadata) relates to information that describes the meaning or purpose of data, which meaning or purpose can be to a human or to a computer process. As an example, technical data information may specify that data is obtained having a value in the format "XXX-XX-XXXX," where X is an integer between 0 and 9. That technical information can be used to determine how the data should be processed, or whether a particular value is valid (e.g., "111-11-1111" is, but "1111-11-1111" is not), but does not indicate what the value represents. Semantic information associated with the data can indicate whether the value is a social security number, a telephone number, a routing address, etc.

Semantic information can also describe how data is to be processed or displayed. For instance, "knowing" that data is a telephone number may cause the value to be displayed in one part of a GUI as opposed to another part of a GUI, or may invoke or not invoke particular processing rules depending on if the rule is active for "telephone number." In at least some cases, "semantic information" can include other types of information that can be used to describe data, or how it should be used or processed. In a particular case, data can be associated with one or more of a label, such as a human understandable description of the data (e.g., "telephone number"), documentation, such as a description of what information should be included in a field having the label (e.g., "enter an 11 digit phone number including area code"), or information that can be used in a help screen (e.g., "enter your home phone number here").

Typically, technical information must be provided for data. In the case of a field of a database table, for example, it is typically necessary to provide a name or identifier for a field and a datatype. The name or identifier for a field might, or might not, serve to provide semantic information. That is, a database designer might choose a name of "Employee_Name," "EMPN," or "3152." However, as the name or identifier is used to locate/differentiate the field from another field, in the context of the present disclosure, it is considered to be technical information, rather than semantic information, even if it may readily convey meaning to a human. In at least some implementations, the use of semantic information is optional. For instance, even using the data dictionary, some fields used in database objects (such as tables, but potentially other objects too, where such other objects are typically associated with one or more tables in an underlying relational database system) can be specified without the use of semantic information, while other fields are associated with semantic information.

Figure 2:
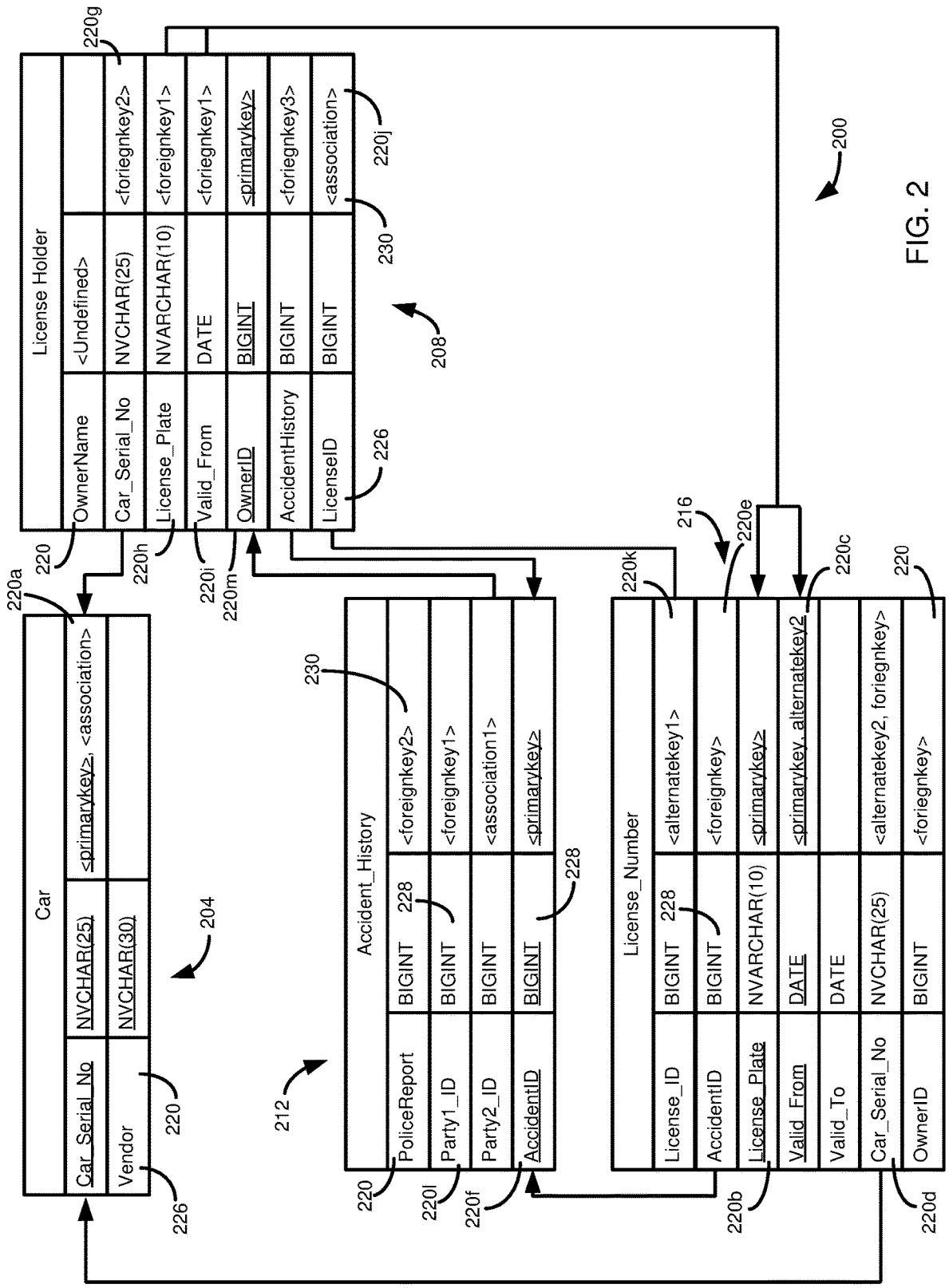
FIG. 2 is a diagram of a database schema showing technical relationships between at least a portion of database tables in the schema.

FIG. 2 is an example entity-relation (ER) type diagram illustrating a data schema 200, or metadata model, related to a driver's accident history. The schema 200 (which can be part of a larger schema, the other components not being shown in FIG. 2) can include a table 208 associated with a license holder (e.g., an individual having a driver's license), a table 212 associated with a license, a table 216 representing an accident history, and a table 204 representing cars (or other vehicles).

Each of the tables 204, 208, 212, 216 has a plurality of attributes 220 (although, a table may only have one attribute in some circumstances). For a particular table 204, 208, 212, 216, one or more of the attributes 220 can serve as a primary key—uniquely identifying particular records in the tuple and being designated as the main method of accessing tuples in the table. For example, in the table 204, the Car_Serial_No attribute 220*a* serves as the primary key. In the table 216, the combination of attributes 220*b* and 220*c* together serve as the primary key.

A table can reference records associated with the primary key of another table through the use of a foreign key. For example, the license number table 216 has an attribute 220*d* for a Car_Serial_No in table 216 that is a foreign key and is associated with the corresponding attribute 220*a* of table 204. The use of a foreign key can serve various purposes. The foreign key can link particular tuples in different tables.

For example, a foreign key value of 8888 for the attribute 220*d* would be associated with a particular tuple in table 204 having that value for attribute 220*a*. Foreign keys can also act as constraints, where a record cannot be created having (or altered to have) a foreign key value that does not exist as a primary key value in the referenced table. Foreign keys can also be used to maintain database consistency, where a change to a primary key value can be propagated to a table where the attribute is a foreign key.

A table can have other attributes, or combinations of attributes, that can serve to uniquely identify tuples, but which are not primary keys. Table 216, for instance, has an alternate key that is formed from attribute 220*c* and attribute 220*d*. Thus, a unique tuple can be accessed in the table 216 using either the primary key (e.g., being a foreign key in another table) or through an association to the alternate key.

Schema information is typically maintained in a database layer, such as a software layer associated with where table values are maintained (e.g., in a RDBMS), and typically includes identifiers for the tables 204, 208, 212, 216, and the name 226 and datatype 228 of their associated attributes 220. Schema information may also include at least some of the information conveyable using the flag 230, such as whether a field is associated with a primary key, or indicating a foreign key relationship. However, other relationships, including more informal associations, may not be included in a schema associated with a database layer (e.g., the INFORMATION_SCHEMA of PostgreSQL).

Example 4

Example Table Elements Including Semantic Identifiers

Figure 3:
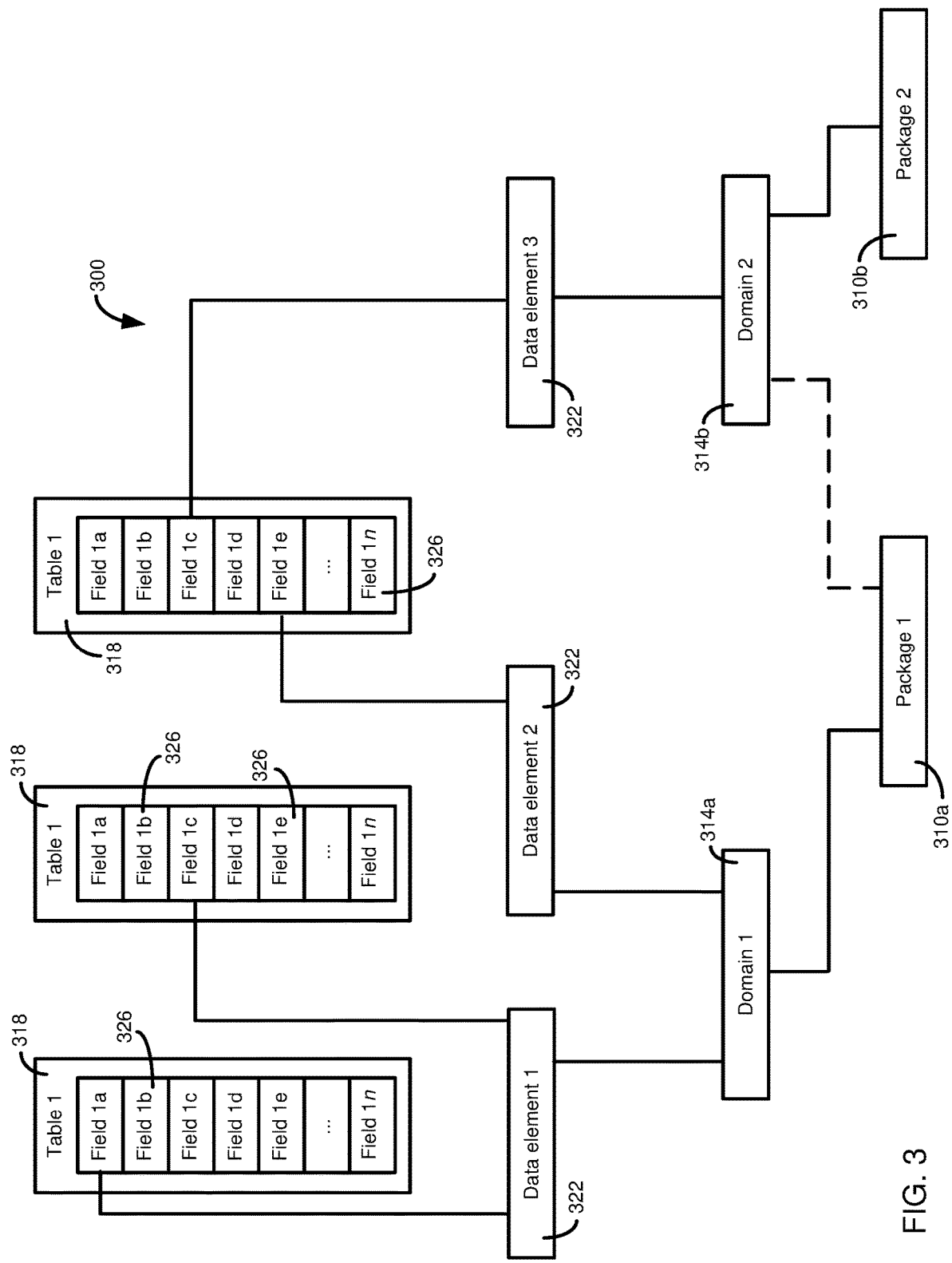
FIG. 3 is a schematic diagram illustrating relationships between table elements that can be included in a data dictionary, or otherwise used to define database tables.

FIG. 3 is a diagram illustrating elements of a database schema 300 and how they can be interrelated. In at least some cases, the database schema 300 can be maintained other than at the database layer of a database system. That is, for example, the database schema 300 can be independent of the underlying database, including a schema used for the underlying database. Typically, the database schema 300 is mapped to a schema of the database layer (e.g., schema 200 of FIG. 2), such that records, or portions thereof (e.g., particular values of particular fields) can be retrieved through the database schema 300.

The database schema 300 can include one or more packages 310. A package 310 can represent an organizational component used to categorize or classify other elements of the schema 300. For example, the package 310 can be replicated or deployed to various database systems. The package 310 can also be used to enforce security restrictions, such as by restricting access of particular users or particular applications to particular schema elements.

A package 310 can be associated with one or more domains 314 (i.e., a particular type of semantic identifier or semantic information). In turn, a domain 314 can be associated with one or more packages 310. For instance, domain 1, 314*a*, is associated only with package 310*a*, while domain 2, 314*b*, is associated with package 310*a* and package 310*b*. In at least some cases, a domain 314 can specify which packages 310 may use the domain For instance, it may be that a domain 314 associated with materials used in a manufacturing process can be used by a process-control application, but not by a human resources application.

In at least some implementations, although multiple packages 310 can access a domain 314 (and database objects that incorporate the domain), a domain (and optionally other database objects, such as tables 318, data elements 322, and fields 326, described in more detail below) is primarily assigned to one package. Assigning a domain 314, and other database objects, to a unique package can help create logical (or semantic) relationships between database objects. In FIG. 3, an assignment of a domain 314 to a package 310 is shown as a solid line, while an access permission is shown as a dashed line. So, domain 314*a* is assigned to package 310*a*, and domain 314*b* is assigned to package 310*b*. Package 310*a* can access domain 314*b*, but package 310*b* cannot access domain 314*a*.

Note that at least certain database objects, such as tables 318, can include database objects that are associated with multiple packages. For example, a table 318, Table 1, may be assigned to package A, and have fields that are assigned to package A, package B, and package C. The use of fields assigned to packages A, B, and C in Table 1 creates a semantic relationship between package A and packages B and C, which semantic relationship can be further explained if the fields are associated with particular domains 314 (that is, the domains can provide further semantic context for database objects that are associated with an object of another package, rather than being assigned to a common package).

As will be explained in more detail, a domain 314 can represent the most granular unit from which database tables 318 or other schema elements or objects can be constructed. For instance, a domain 314 may at least be associated with a datatype. Each domain 314 is associated with a unique name or identifier, and is typically associated with a description, such as a human readable textual description (or an identifier than can be correlated with a human readable textual description) providing the semantic meaning of the domain. For instance, one domain 314 can be an integer value representing a phone number, while another domain can be an integer value representing a part number, while yet another integer domain may represent a social security number. The domain 314 thus can held provide common and consistent use (e.g., semantic meaning) across the schema 300. That is, for example, whenever a domain representing a social security number is used, the corresponding fields can be recognized as having this meaning even if the fields or data elements have different identifiers or other characteristics for different tables.

The schema 300 can include one or more data elements 322. Each data element 322 is typically associated with a single domain 314. However, multiple data elements 322 can be associated with a particular domain 314. Although not shown, multiple elements of a table 318 can be associated with the same data element 322, or can be associated with different data elements having the same domain 314. Data elements 322 can serve, among other things, to allow a domain 314 to be customized for a particular table 318. Thus, the data elements 322 can provide additional semantic information for an element of a table 318.

Tables 318 include one or more fields 326, at least a portion of which are mapped to data elements 322. The fields 326 can be mapped to a schema of a database layer, or the tables 318 can be mapped to a database layer in another manner. In any case, in some embodiments, the fields 326 are mapped to a database layer in some manner Or, a database schema can include semantic information equivalent to elements of the schema 300, including the domains 314.

In some embodiments, one or more of the fields 326 are not mapped to a domain 314. For example, the fields 326 can be associated with primitive data components (e.g., primitive datatypes, such as integers, strings, Boolean values, character arrays, etc.), where the primitive data components do not include semantic information. Or, a database system can include one or more tables 318 that do not include any fields 326 that are associated with a domain 314. However, the disclosed technologies can include a schema 300 (which can be separate from, or incorporated into, a database schema) that includes a plurality of tables 318 having at least one field 326 that is associated with a domain 314, directly or through a data element 322.

Example 5

Example Data Dictionary Components

Schema information, such as information associated with the schema 300 of FIG. 3, can be stored in a repository, such as a data dictionary. In at least some cases the data dictionary is independent of, but mapped to, an underlying relational database. Such independence can allow the same database schema 300 to be mapped to different underlying databases (e.g., databases using software from different vendors, or different software versions or products from the same vendor). The data dictionary can be persisted, such as being maintained in stored tables, and can be maintained in memory, either in whole or part. An in-memory version of a data dictionary can be referred to as a dictionary buffer.

Figure 4:
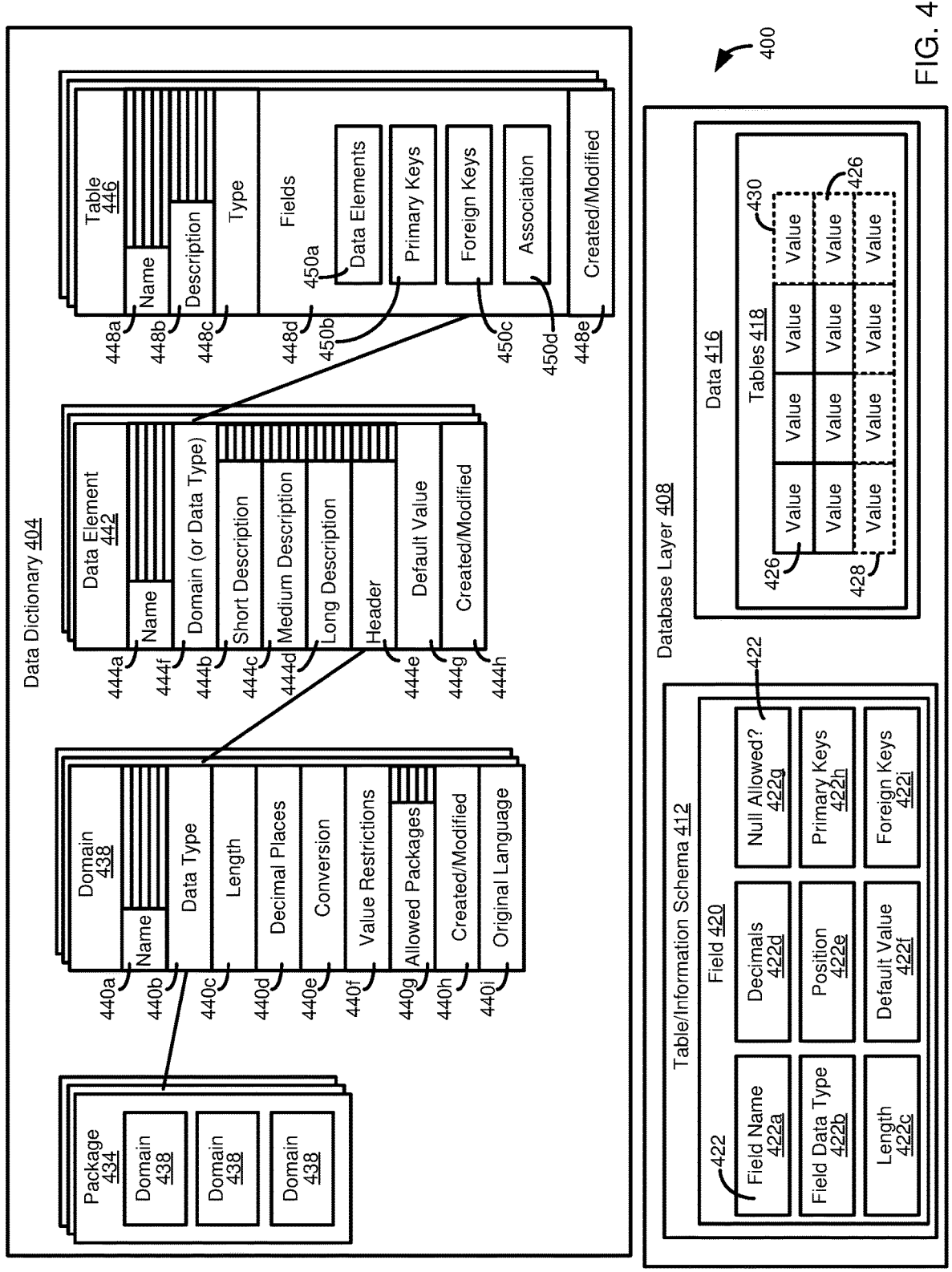
FIG. 4 a schematic diagram illustrating components of a data dictionary and components of a database layer.

FIG. 4 illustrates a database environment 400 having a data dictionary 404 that can access, such as through a mapping, a database layer 408. The database layer 408 can include a schema 412 (e.g., an INFORMATION_SCHEMA as in PostgreSQL) and data 416, such as data associated with tables 418. The schema 412 includes various technical data items/components 422, which can be associated with a field 420, such as a field name 422*a* (which may or may not correspond to a readily human-understandable description of the purpose of the field, or otherwise explicitly describe the semantic meaning of values for that field), a field data type 422*b* (e.g., integer, varchar, string, Boolean), a length 422*c* (e.g., the size of a number, the length of a string, etc., allowed for values in the field), a number of decimal places 422*d* (optionally, for suitable datatypes, such as, for a float with length 6, specifying whether the values represent XX.XXXX or XXX.XXX), a position 422*e* (e.g., a position in the table where the field should be displayed, such as being the first displayed field, the second displayed field, etc.), optionally, a default value 422*f* (e.g., "NULL," "0," or some other value), a NULL flag 422*g* indicating whether NULL values are allowed for the field, a primary key flag 422*h* indicating whether the field is, or is used in, a primary key for the table, and a foreign key element 422*i*, which can indicate whether the field 420 is associated with a primary key of another table, and, optionally, an identifier of the table/field referenced by the foreign key element. A particular schema 412 can include more, fewer, or different technical data items 422 than shown in FIG. 4.

The tables 418 are associated with one or more values 426. The values 426 are typically associated with a field 420 defined using one or more of the technical data elements 422. That is, each row 428 typically represents a unique tuple or record, and each column 430 is typically associated with a definition of a particular field 420. A table 418 typically is defined as a collection of the fields 420, and is given a unique identifier.

The data dictionary 404 includes one or more packages 434, one or more domains 438, one or more data elements 442, and one or more tables 446, which can at least generally correspond to the similarly titled components 310, 314, 322, 318, respectively, of FIG. 3. As explained in the discussion of FIG. 3, a package 434 includes one or more (typically a plurality) of domains 438. Each domain 438 is defined by a plurality of domain elements 440. The domain elements 440 can include one or more names 440a. The names 440a serve to identify, in some cases uniquely, a particular domain 438. A domain 438 includes at least one unique name 440a, and may include one or more names that may or may not be unique. Names which may or may not be unique can include versions of a name, or a description, of the domain 438 at various lengths or levels of detail. For instance, names 440a can include text that can be used as a label for the domain 438, and can include short, medium, and long versions, as well as text that can be specified as a heading. Or, the names 440a can include a primary name or identifier and a short description or field label that provides human understandable semantics for the domain 438.

In at least some cases, the data dictionary 404 can store at least a portion of the names 440a in multiple language, such as having domain labels available for multiple languages. In embodiments of the disclosed technologies, when domain information is used for identifying relationships between tables or other database elements or objects, including searching for particular values, information, such as names 440a, in multiple languages can be searched. For instance, if "customer" is specified, the German and French portion of the names 440a can be searched as well as an English version.

The domain elements 440 can also include information that is at least similar to information that can be included in the schema 412. For example, the domain elements 440 can include a data type 440b, a length 440c, and a number of decimal places 440d associated with relevant data types, which can correspond to the technical data elements 422b, 422c, 422d, respectively. The domain elements 440 can include conversion information 440e. The conversion information 440e can be used to convert (or interconvert) values entered for the domain 438 (including, optionally, as modified by a data element 442). For instance, conversion information 440e can specify that a number having the form XXXXXXXXX should be converted to XXX-XX-XXXX, or that a number should have decimals or comma separating various groups of numbers (e.g., formatting 1234567 as 1,234,567.00). In some cases, field conversion information for multiple domains 438 can be stored in a repository, such as a field catalog.

The domain elements 440 can include one or more value restrictions 440f. A value restriction 440f can specify, for example, that negative values are or are not allowed, or particular ranges or threshold of values that are acceptable for a domain 438. In some cases, an error message or similar indication can be provided as a value is attempted to be used with a domain 438 that does not comply with a value restriction 440f. A domain element 440g can specify one or more packages 434 that are allowed to use the domain 438.

A domain element 440h can specify metadata that records creation or modification events associated with a domain element 438. For instance, the domain element 440h can record the identity of a user or application that last modified the domain element 440h, and a time that the modification occurred. In some cases, the domain element 440h stores a larger history, including a complete history, of creation and modification of a domain 438.

A domain element 440i can specify an original language associated with a domain 438, including the names 440a. The domain element 440i can be useful, for example, when it is to be determined whether the names 440a should be converted to another language, or how such conversion should be accomplished.

Data elements 442 can include data element fields 444, at least some of which can be at least generally similar to domain elements 440. For example, a data element field 444a can correspond to at least a portion of the name domain element 440a, such as being (or including) a unique identifier of a particular data element 442. The field label information described with respect to the name domain element 440a is shown as separated into a short description label 444b, a medium description label 444c, a long description label 444d, and a header description 444e. As described for the name domain element 440a, the labels and header 444b-444e can be maintained in one language or in multiple languages.

A data element field 444f can specify a domain 438 that is used with the data element 442, thus incorporating the features of the domain elements 440 into the data element. Data element field 444g can represent a default value for the data element 442, and can be at least analogous to the default value 422f of the schema 412. A created/modified data element field 444h can be at least generally similar to the domain element 440h.

Tables 446 can include one or more table elements 448. At least a portion of the table elements 448 can be at least similar to domain elements 440, such as table element 448a being at least generally similar to domain element 440a, or data element field 444a. A description table element 448b can be analogous to the description and header labels described in conjunction with the domain element 440a, or the labels and header data element fields 444b-444e. A table 446 can be associated with a type using table element 448c. Example table types include transparent tables, cluster tables, and pooled tables, such as used as in database products available from SAP SE of Walldorf, Germany.

Tables 446 can include one or more field table elements 448d. A field table element 448d can define a particular field of a particular database table. Each field table element 448d can include an identifier 450a of a particular data element 442 used for the field. Identifiers 450b-450d, can specify whether the field is, or is part of, a primary key for the table (identifier 450b), or has a relationship with one or more fields of another database table, such as being a foreign key (identifier 450c) or an association (identifier 450d).

A created/modified table element 448e can be at least generally similar to the domain element 440h.

Example 6

Example Metadata Model

FIG. 5 illustrates a definition of a metadata model 500. The metadata model 500, in particular, represents a view, such as a Core Data Services view of SAP SE, of Walldorf, Germany. The metadata model 500 can include a variety of different components, at least some of which can be considered to be metadata models. That is, the metadata model 500 can be a model that is based at least in part on multiple sub-models. The sub-models can specify particular aspects of the overall metadata model 500.

The metadata model 500 can optionally include one or more annotations 504. An annotation can be a metadata component that can be added to a metadata model. For example, a provider may supply a base model, and individual users or customers may wish to add metadata that is specific to their operating environment and use cases. The ability to add annotations can thus enhance usability by allowing for custom metadata elements, without impacting other users of a base metadata model. Annotations can be specified for different software layers or frameworks.

In the example shown, annotations 504 can be indicated as annotations using particular syntax elements, such as by preceding an annotation with the "@" symbol. In at least some cases, annotations 504 can also be indicated by placing them in the appropriate portion of a metadata model, such as in a header section or another section designated for annotations. In some cases, annotations 504 can reference other metadata models, such as a metadata model of a data source, or can reference a data source that is associated with a metadata model. In either event, such an association 504 can create a dependency between the metadata model 500 and the other metadata model/data source.

The metadata model 500 can include instructions 508, in this case a SQL statement 510, defining a core metadata model/object having an identifier 512 (which can be used, for example to later access or activate, such as to instantiate, the metadata model). In particular, the instructions 508 shown define a view. The annotations 504 further specify properties of the view, as do other portions of the metadata model 500 that will be further described.

The instructions 508 can specify one or more data sources 516. Data sources 516 can define data to which at least a portion of the metadata of the metadata model 500 will apply, and can also supply additional metadata for the metadata model 500. Note that the metadata model 500 can be, in at least a sense, dependent on referenced data sources 516. For example, if the metadata model 500 relies on particular expected data or metadata of a data source 516, the metadata model may be unusable, have performance issues, or provide incorrect results if the referenced data sources do not include expected data or metadata, or are otherwise inconsistent with how the data source is used in the metadata model. As shown, the data sources 516 includes two tables, "vbak" and "vbkd." These tables will typically include metadata features such as one or more fields, where each field is associated with a data type, designations of a primary key, and optionally associations with other database components, such as association or foreign key relationships with other database tables.

The metadata model 500 can optionally include specifications of one or more associations 520. An association 520 can define a relationship to another entity. An association 520 can be processed during the use of the metadata model 500, such as being converted to a SQL expression such as a JOIN. Unlike other conditions or elements that are included in the metadata model 500, associations can define a relationship that can at least in some cases be optional, such as being selectively activated depending upon how the metadata model is accessed. For example, an association 520 can be converted to a JOIN condition that uses a table provided in a SELECT statement that references the metadata model 500.

The metadata model 500 can include one or more components 522 that specify how data retrieved using the metadata model should be processed, including to generate values that are associated with other metadata elements of the metadata model. Processing can include calculating values, such as using a formula specified in, or referenced by, the metadata model 500. In particular, a processing component 522 can specify that a particular field value should be treated as an element 524, where an element can be as described in Examples 4 and 5. Thus, the metadata model 500 can include dependencies on how elements are defined, and the metadata model 500 may not be accurate, or useable, if the element definition does not match how it is used, and intended to be used, in the metadata model 500.

The metadata model 500 can optionally include additional components, such as one or more conditions 528, or other operations, such as aggregations, unions, etc., including such operations that are typically supported by a database query language.

Example 7

Example Metadata Model, Including Relationships with Other Metadata Models

FIG. 6 illustrates how metadata models may have dependencies on other metadata models. In particular, FIG. 6 shows a view metadata model 604, which can be the metadata model 500 of FIG. 5. FIG. 6 also illustrates a metadata model 608 for an access control object (such as a DCLS, or data control language source), a metadata model 612 for a metadata extension object (such as a DDLX, or metadata extension), and a metadata model 616 for an extension element object (such as a DDLS, or data definition language source).

The access control object metadata model 608 can be used for restricting access to data that can be retrieved using the view metadata model 604. For example, the view metadata model 604 and the access control object metadata model 608 can be processed together when the view metadata model 604 is activated, such as to generate SQL commands that retrieve data for the view metadata model, but which are filtered or restricted based on the access control object metadata model. As the access control object metadata model 608 references the view metadata model 604, the access control object metadata model depends on the view existing, and on the view containing elements specified in the access control object metadata model. For example, the access control object metadata model references the "SalesOrderType" element of the view "I_SampleSalesOrder" and the authorization object "V_VBAK_AAT" with its authorization field "AUART". Thus, the first element would be undefined or unusable if the corresponding element did not exist in the view metadata model 604.

The metadata extension object metadata model 612 (which adds annotations to the view metadata model 604) has similar dependencies on the view metadata model, as does the extension element object metadata model 616 (which adds additional elements to the view metadata model).

Example 7

Example Relational Model of Metadata Models

Figure 7:
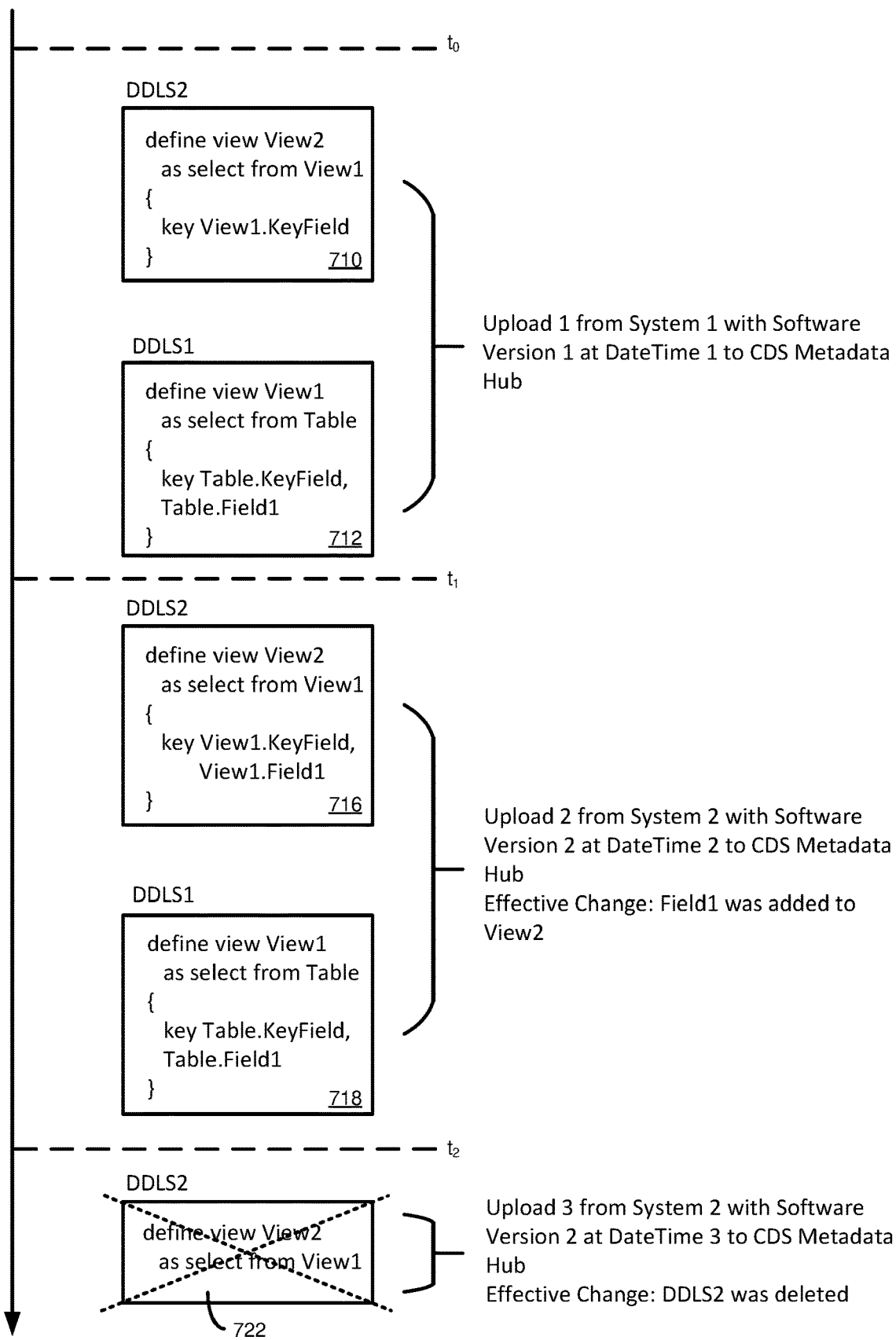
FIG. 7 is a schematic diagram illustrating how metadata models can be interrelated, and updated or deleted, including by multiple computing systems.

FIG. 7 illustrates how metadata models may be dependent on one another, and can be changed over time, which can affect the use or validity of dependent metadata models. At time $t_0$, data definition language versions of metadata models are provided to a metadata hub, such as the metadata hub 116 of FIG. 1. The metadata models are for two database objects, a model 710 for a View1 and a model 712 for a View2. The model 712 for View2 references View1, as it contains a SQL select statement that defines a particular subset of data defined by the model 710 for View1. Thus, the model 710 includes a dependency on the model 712. In particular, the model 710 depends on View1 existing, and there being a field "KeyField" in View 1.

At time $t_1$, a model 716 for a second version of View2 is uploaded to the metadata hub. The model 716 can be provided by the same system that originally provided the models 710, 712, or can be provided by a different system. For the purposes of this Example 7, it will be assumed that the model 716 is uploaded by a different system than the system that uploaded models 710, 712, and that the systems have different software versions (versions 1 and 2, respectively, for the first system and the second system). Compared with the model 712, the model 716 includes another field, Field1, of View1, in the definition of View2. In some cases, the model 716 can be provided as a complete model, while in other cases only changes compared with a prior model version are sent. Similarly, the upload by the second system at time $t_1$ includes a model 718 for View1, which is identical to the model 710 for View1. In some cases, if a model has not changed from a prior version, it is not sent to the metadata hub. However, in other cases, all or a selected portion of metadata models can be sent to the metadata hub, or, if a model is updated, deleted, or added, that model and all dependent models are sent to the metadata hub, even if the dependent metadata models were not changed.

At a time $t_2$, the second system uploads an indication 722 that View2 was deleted at the second system. Note that, in this case, the deletion of View2 does not affect any described metadata model, as View2 depended on View1, but View1 did not depend on View2. If, instead, View1 had been deleted at time $t_2$, the metadata hub, or another component of the environment 100, could determine that deleting View1 would create issues with View2.

Figure 8A:
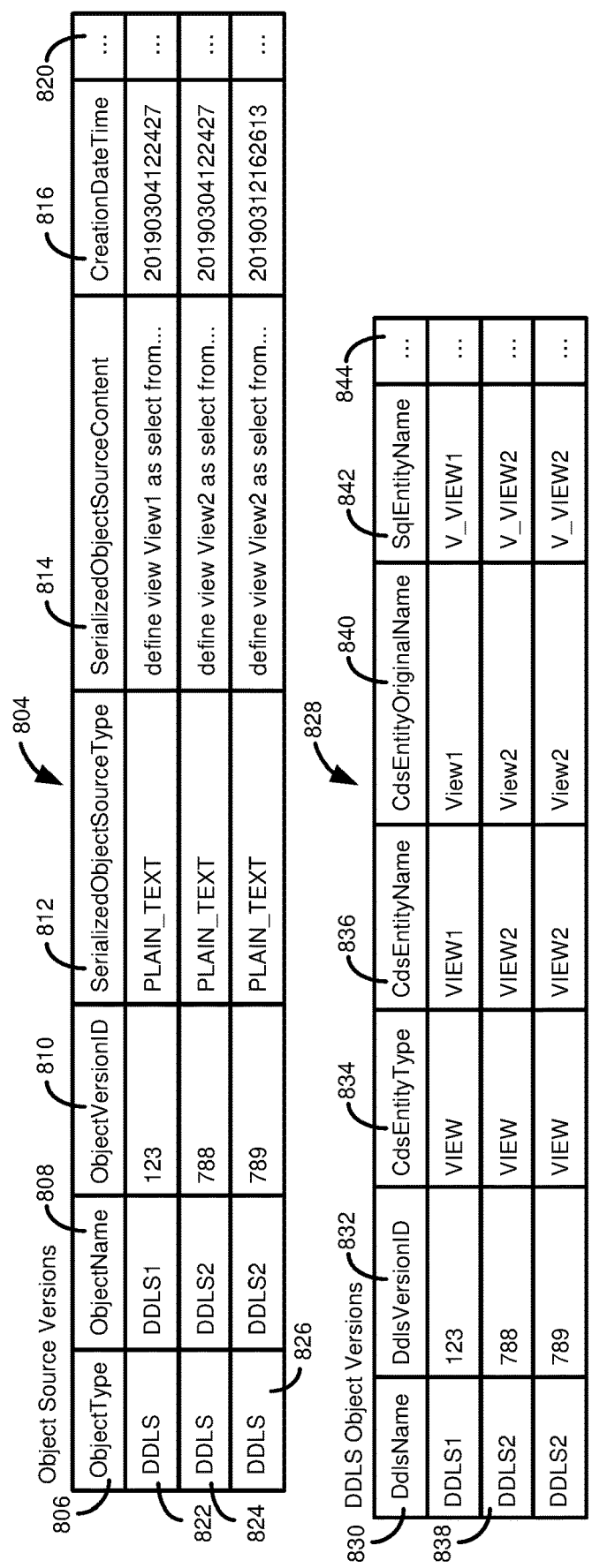

FIG. 7 illustrates the metadata models as defined in a first format, such as a SQL statement defining the views. FIGS. 8A and 8B illustrates how the metadata models shown in FIG. 7 can be converted to a different format, such records in a collection of database tables used to store representations of metadata models. In particular, FIG. 8A shows a table 804 that includes a field 806 for an object type associated with a record of the table, a field 808 holding a name of the object, a field 810 holding a version identifier associated with the object, a field 812 providing a type associated with an original format in which the corresponding metadata model was received (e.g., plain text, JSON, XML, CSON, etc.), a field 814 holding a listing of the original source content (in the type associated with the field 812), and a field 816 that includes a timestamp of when the object was received (e.g., with reference to FIG. 7, a timestamp associated with time $t_0$, $t_1$, or $t_2$). The table 804 can optionally include one or more additional fields 820.

It can be seen that the table 804 includes a record 822 for View1, received at $t_0$, a record 824 for the metadata model of View2 received at $t_0$, and a record 826 for the metadata model of View2 received at $t_1$. Note that table 804 can include information for object source versions, and so type, name, and version information (i.e., fields 806, 808, 810) can be specific for the object as an object source (e.g., a data definition language source, or DDLS). In some cases, an object source can be an identifier assigned to the object by the metadata hub, or a metadata management system associated with the metadata hub.

A table 828 can include fields for data definition language object versions, which can include a field 830 for a DDLS name and a field 832 for a DDLS version identifier, which fields can correspond to the fields 808, 810 of the table 804. The table 828 can further include a field 834 that describes an entity (e.g., metadata model) type associated with the corresponding metadata model. Examples of entity types can be table, view, access control, annotation extension, metadata extension, etc.

A field 836 can include an entity name or identifier, which can be a name or identifier assigned to the metadata model in the declaration of the metadata model, such as in the SQL statements shown in FIG. 7. For example, FIG. 7 shows metadata model 710 as defining a VIEW1, which then supplies the type indicated in field 834, and the name entered in field 836 indicated for a record 838. Note that field 836 can be a canonical form of the name of the metadata model, and the original name, supplied in the metadata model definition, can be included in a field 840. Similarly, the canonical name of field 836 can be associated with other formats, such as a format provided in a field 842, which, as shown, can be a name used in SQL queries for the metadata model, which can correspond to a name of the metadata model used in a database layer, such as in an information schema. The table 828 can include one or more additional fields 844.

As shown in FIG. 8A, all of the information for the metadata models provided at to and $t_1$ in FIG. 7 can be retrieved from the tables 804, 828, either from individual fields or from the field 814 with the original source content. FIG. 8B illustrates tables 850, 852, 854, 856, which can store additional information about the metadata models, including about the systems from which the metadata models, or updates (including deletions) were received. In particular, table 850 can be used to associate metadata models with software component version identifiers, which can be used to describe the operating environment on the system from which the metadata model was received. Table 850 includes a field 860 for the software component version ID associated with the metadata model object name listed in field 864 (and which corresponds to the field 808 of table 804) and the version identifier of field 866 (which corresponds to the field 810 of table 804). A type for the object can be specified in a field 862.

When a metadata model is changed, the version associated with the identifier in the field 866 can be linked to a prior version of the metadata model, which can be stored in a field 868. In the case of a metadata model deletion, a deletion time can be listed in a field 870 (where no value, or a NULL value, can indicate that the object has not been deleted). In some cases, the deletion field 870 can be filled out for all versions of the data model. In other cases, the deletion field 870 is only populated for the last version of the metadata model prior to the deletion.

The table 852 can associate particular software components, listed in field 872 (and corresponding to field 860) with specific system software versions listed in a field 874. In turn, table 854 can associate the specific software system versions, in a field 876, with specific systems indicated by a system identifier in a field 878, and a timestamp in field 880 indicating when the system was installed, released, or activated. The table 856 can include a field 882 for particular software component versions, corresponding to field 860 with an identifier of the software component provided in field 884, a release identifier in field 886, and a support package identifier in a field 888. Each of the tables 850, 852, 854, 856 can optionally include one or more additional fields 890.

Example 8

Example Metadata Relational Model, Including Query Language Operations

Figure 9:
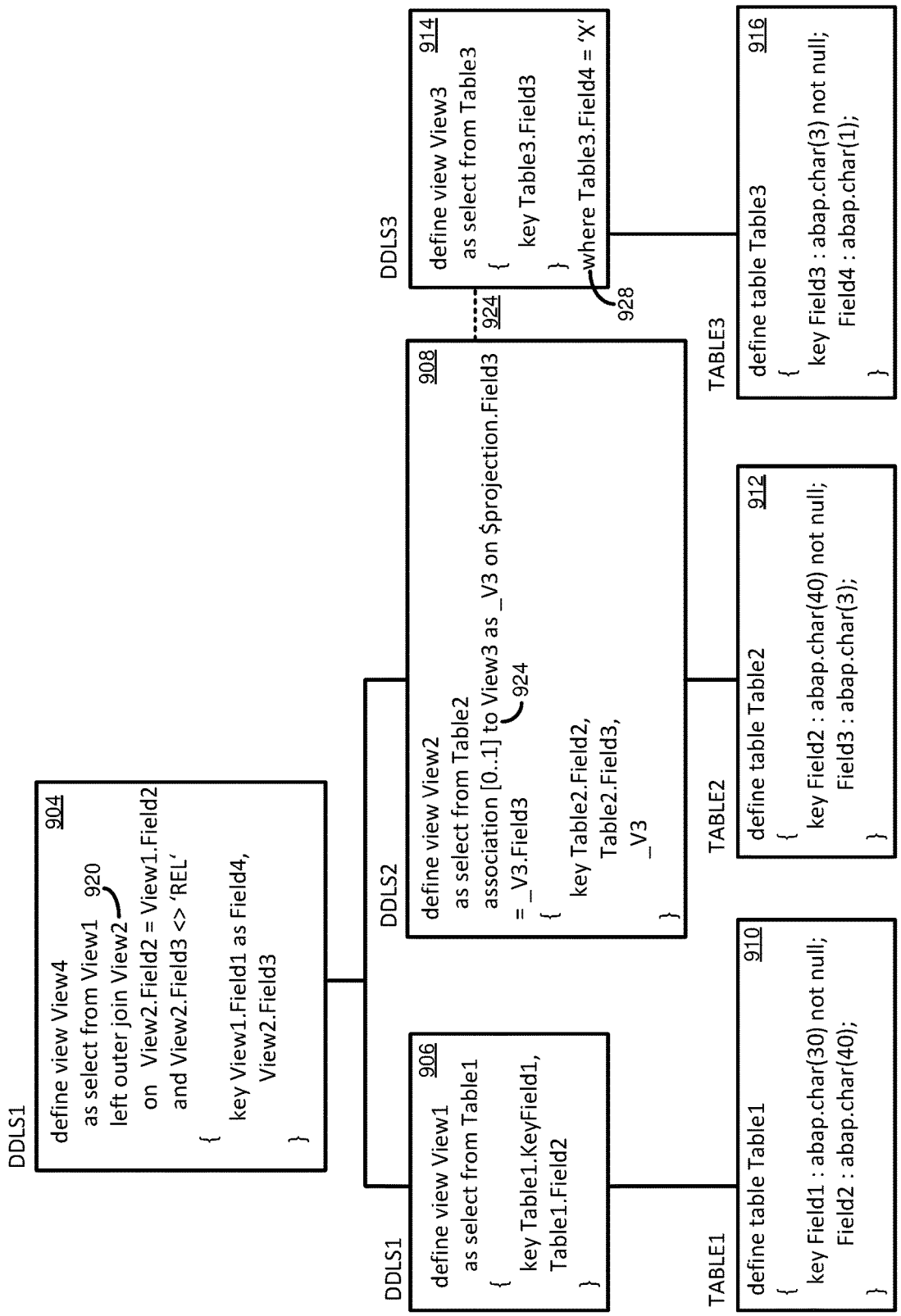
FIG. 9 is a schematic diagram illustrating how metadata models can be interrelated, and can include query operations, such as select statements, join conditions, and where conditions, and how database objects can be related by associations.

FIG. 9 illustrates a scenario where a metadata model 904, in particular, a view, is defined with reference to two view metadata models 906, 908, which can in turn depend on one or more additional data models. The metadata model 906 depends from a metadata model 910 for a table, while the metadata model 908 depends from a metadata model 912 for a table, and has an association with a metadata model 914 for another view, which in turn references a metadata model 916 for a table.

The view metadata models 904, 906, 908, 914 include SQL select statements that can be stored in an alternative format, such as in tabular form, as shown in FIG. 10. The select statements of the view metadata models 904, 906, 908, 914 of FIG. 9 can include additional features/operations that can be stored in an alternative representation, such as a join condition 920 in the metadata model 904, an association 924 between the metadata model 908 and the metadata model 914, and a where condition 928 in the metadata model 914.

FIG. 10 illustrates a table 1004 that can store information for metadata models having select statements in tabular format. Table 1004 includes a field 1008 for an object type, which for the metadata models 904, 906, 908, 914 is a data definition language source object. A field 1010 includes a name or identifier for each record, which can be a system assigned name, or a name used for system purposes, for a given object, such as to uniquely identify each object.

Note that the SQL statements in FIG. 9 do not assign the name used in the field 1010. A field 1012 can store an object version identifier value for the object associated with each record. In some cases, the value stored in the field 1012 can be unique to the given object, and can be incremented when a change is made to the object. For example, record 1016 is shown as having an object version identifier of 56 for the DDLS1 object. If the DDLS1 object is changed again, the object version identifier can be incremented to 57.

The table 1004 can include a field 1020 that stores an entity name, which can be an entity name used in the SQL statements shown in FIG. 9. For example, the metadata model 904 defines a view View4, which is the name provided in the field 1020 for record 1022, corresponding to View4. In at least some cases, each object in the table 1004 can be associated with a primary data source. For example, a SQL statement can have the form "SELECT FROM primaryDataSource," where the identifier of "primaryDataSource" is stored in the field 1024. For metadata model 904, View4 is defined primarily with respect to View1, and so View1 is listed in field 1024 for record 1022. The primary data source of field 1024 can have a type, such as table or field, which type is provided in a field 1026.

As described, a select statement used in a metadata model can have additional operations, which can be recorded in the table 1004. If an object metadata model definition includes a where condition, an identifier for that condition can be included in a field 1028. Metadata model 914 includes where condition 928, and so an identifier for that condition can be entered in the field 1028 for record 1022. The identifier in the field 1028 can identify a particular condition collection, where additional information can be included in a condition collection table 1032, as will be further described. Similarly, if an object metadata model definition includes a join condition, an identifier for the condition can be included in a field 1036. The identifier in the field 1034 can identify a condition collection in the table 1032.

The table 1032 allows condition details associated with the select statements in table 1004 to be further detailed. The table 1032 includes an object type field 1038 and an object name field 1040, which can correspond to the fields 1008, 1010 of table 1004. Note that the join condition of metadata model 904 is represented by records 1044-1048, the "where" condition of metadata model 914 is represented by record 1050, and the "on" condition of the association of metadata model 908 is represented by record 1052.

The table 1032 includes a field 1056 for a version identifier of the object listed in the field 1040, and can correspond to the field 1012. A field 1058 includes condition collection identifiers, and can correspond to the fields 1028, 1036. A group ID field 1060 and a grouping ordinal number field 1062 can be used to preserve the semantics of the conditions as originally expressed (e.g., in SQL). For example, the group ID field 1060 can be used to indicate portions of a condition that are associated with a data source indicated in a field 1064. So, record 1044 is associated with a group identifier in field 1060 of 1, as it is associated with a value of VIEW1 in field 1064, while records 1046, 1048 are associated with a group identifier of 2, as both records are both associated with a value of VIEW2 for field 1064. The values of the grouping ordinal number field 1062 can further identify particular semantics for the records 1046, 1048, such as indicating that record 1046 precedes record 1048 in the original select statement. A grouping operator field 1066 can provide an operator that associates records associated with a particular group identifier value of the field 1060.

For a given operator or relation listed in a field 1068, fields 1070, 1064, 1072, 1074 can list a left group identifier, the left data source name, a left field name, and a left value, respectively. Similarly, fields 1076, 1078, 1080, 1082 can provide a right group identifier, a right group source name, a right field name, and a right value, respectively. "Left" and "right" refer to the position of the values with respect to the operator of the field 1068.

It can thus be seen that the records of the table 1032 can be used to reconstitute the operations or conditions of the metadata models in the format shown in FIG. 9. Although the table 1032 may not explicitly list a type of operation or condition, that information can be gathered from the fields 1028, 1036 of the table 1004 (or from the table 1084, as will be further described).

An association definition table 1084 can define associations included in metadata models, such as models provided in the format shown in FIG. 9, and can include an object type field 1086, an object name field 1087, an object version identifier field 1088, and an entity name field 1089, which can be as described for the fields 1008, 1010, 1012, 1020 of table 1004. A field 1090 can store a standardized version of an object identifier (e.g., an identifier of an object metadata model) listed in a field 1092, which can be the object name as included in the association definition in the original metadata model, such as the association 924. A field 1094 can provide a name of the associated entity, and a type associated with the entity (e.g., table, view) can be provided in a field 1095. An association can be associated with a minimum cardinality and a maximum cardinality, fields 1096 and 1097, respectively. A field 1098 can include a condition collection identifier, which can correspond to the field 1058 of the table 1032.

Taking the example association 924 of FIG. 9, the record 1052 sets forth the condition defined for the association (i.e., the "on" condition). For example, values in a FIELD3 of the table referenced by the view 908 being defined being equal to a FIELD3 of the associated view defined in metadata model 914, which in turn are associated with the table defined in metadata model 916.

The tables 1004, 1032, 1084 can optionally include one or more additional fields 1099.

Example 9

Example Relational Metadata Model, Including Field Definitions and Relations

In some cases, a metadata object, such as a view, can include fields that are calculated or otherwise based at least in part on elements (e.g., fields) of one or more other metadata models. The calculations can be explicitly specified in the metadata model definition, or can be referenced in the model definition, such as by calling in a built in function or referencing a function in another metadata model, in a library, an API call, etc.

FIG. 11 illustrates a metadata model 1104 that defines a view with reference to a metadata model 1108, that in turn references a table defined by a metadata model 1112. The metadata model 1104 includes four fields, 1120, 1122, 1124, 1126 that are derived from fields in the metadata model 1108. The metadata model 1108 includes three fields 1130, 1132, 1134 that are selected from the table defined by the metadata model 1112. The table defined by the metadata model 1112 includes three fields 1140, 1142, 1144 that are declared/defined in that metadata model.

FIG. 12 illustrates a table 1200 that can be used to summarize the fields used in the metadata models 1104, 1108, 1112. The table 1200 includes a field 1202 that indicates the type of object with which the field is associated, such as being associated with a table or a data definition language source object (e.g., a view). A name of the object is provided in a field 1204, which can be an object name used by, or supplied by, a system with which the metadata model is used, or, for example, by a metadata hub. A version identifier for the object can be provided in a field 1206, which, as discussed for other metadata model representations, can be a unique number for each object, and can be incremented as the object is changed. An entity name field 1208 can include a name that is associated with the metadata model, such as a name that is defined in the declaration of the metadata model.

Each metadata object can be associated with one or more fields, and a field 1210 can store a standardized representation of a field name provided in a field 1212. For example, the field 1210 can store a name that removes formatting/capitalization (e.g., lower case letters) from the field name listed in the field 1212. As described, metadata models may incorporate fields from other metadata models. The immediate source of the field can have a name, provided in a field 1214, and can have a type, such as a table or view, and this type can be provided in a field 1216. The name of the field in the immediate source can be different than the name of the field in the metadata model into which it is incorporated, so a field 1218 can include the name of the field in the source metadata model.

Calculated fields can be associated with an expression, and an identifier for the expression can be provided in a field 1220, which can be used to access the expression, such as an expression stored as a representation in one or more other tables. A field 1222 can indicate whether the field is a key field (e.g., a field used in a primary key). As described in Examples 2-5, fields can be associated with a data type, which can be listed in a field 1226, and a data type can be associated with additional semantic or technical information, such as in a data element, an identifier for which can be provided in a field 1224. Often, a data type associated with a field 1226 (and in turn with the field 1224) can have a length, such as number of digits or characters that are allowed, and this information can be included in a field 1228.

Numerical fields that allow for the use of decimals can be associated with a value (e.g., a number of decimal places allowed) through a field 1230. Fields 1232, 1234, 1236, 1238 can be used to define where in a source metadata model a definition of the expression appears, such as a start line, start column, end line, and end column, respectively. The table 1200 can optionally include one or more additional fields 1240.

As an example of how the table 1204 can be used to represent fields from the metadata models of FIG. 11, consider record 1250, associated with the metadata model 1108. Metadata model 1108 is for a view, VIEW1, and references a Field1 of Table1 (defined by the metadata model 1112), which is a key field. Record 1252 corresponds to the definition of Field1 of Table1 in the metadata model 1112, where Field1 is defined as a key field, that has data element type DE1, and may not be a null value. Record 1250 includes the name of the object, VIEW1, in field 1208, the name, FIELD1, of the field in the object in field 1210, the original name, Field1, of the field in the object in field 1214, the name of the entity where the field is referenced from, TABLE1, in field 1216, the type of the referenced entity, TABL (for table) in field 1216, and the name of the field, FIELD1, in the referenced entity in field 1218. Field 1222 of record 1250 is set to TRUE, indicating that the field associated with record 1250 is a key field, while field 1224 specifies that the field has a data element type of DE1, which fields 1226 and 1228 indicate is a character data type of length 30.

Example 10

Example Relational Metadata Model, Including Annotations

Figure 13:
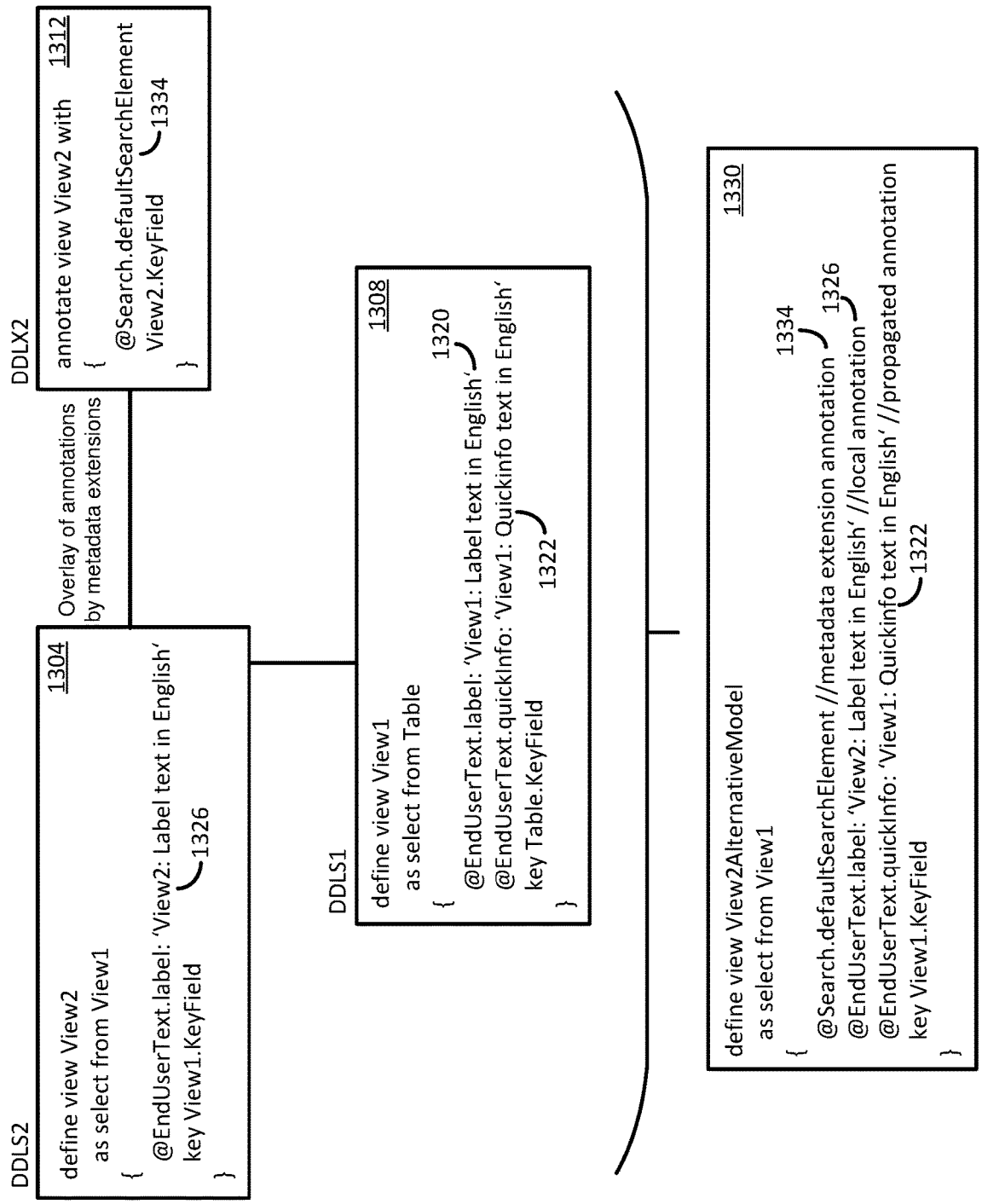
FIG. 13 is a schematic diagram illustrating how metadata models can be related, including metadata models having annotations and metadata models that annotate other metadata models.

As described in Example 6, a metadata object, such as a view definition, can include annotations. FIG. 13 illustrates how metadata objects, which can have dependencies on one another, can have annotations, which can be stored in another format, such as the format shown in the table 1400 of FIG. 14.

FIG. 13 includes a metadata model 1304 for a view, View2, which is defined with respect to another view, View1, defined in metadata model 1308. A metadata model 1312 for a metadata extension, DDLX2, provides additional metadata elements for the metadata model 1304. The metadata model 1308 includes two annotations, 1320, 1322 that may be incorporated into the metadata model 1304. However, the annotation 1320, which provides a label for View1, is superseded by an annotation 1326 defined in the metadata model 1304 for View2. An annotation can be superseded, in some cases, if the annotation has the same name or type (e.g., "@EndUserText.label" as shown) in the referencing metadata model as in the referenced metadata model.

Metadata model 1330 illustrates an "effective" representation of the metadata model 1304, including annotations incorporated into the metadata model 1304 by dependency. It can be seen that the effective metadata model 1330 includes the annotation 1326, but not the annotation 1320. As the annotation 1322 for the metadata model 1308 is not superseded, it is included in the effective metadata model 1330, as is an annotation 1334 from the metadata model 1312.

The table 1400 can summarize the annotations of the metadata models of FIG. 13. The table 1400 includes a field 1404 for an object type associated with the metadata model which is annotated by a record representing an annotation. As shown, the field 1404 includes values of "DDLS" for views, or "DDLX" for metadata extension objects. A field 1408 can provide a name of the object, such as a system name, while a field 1412 can provide an object name defined by the declaration of the object. A field 1410 can provide a version identifier for the object. A field 1414 can provide a name of a subentity associated with an annotation, which can be, for example, a particular view field to which an annotation applies.

A field 1416 can provide an annotation internal identifier, which can be used to distinguish between multiple annotations for a metadata model, and can be used to provide an ordering of annotations when multiple annotations are present in a metadata model. A value of the field 1416 can also be used to correlate a base or parent annotation or annotation type with a sub-annotation, as will be further described. An annotation name can be included in a field 1418, which can be a type (or class) or subtype (or class method or class data member) of an annotation. A field 1420 can provide an identifier for a parent annotation. For example, record 1440 assigned an annotation internal identifier of "1" to the "ENDUSERTEXT" annotation. "ENDUSERTEXT" can be a base annotation type, and record 1442 can include the subtype of the annotation, "ENDUSERTEXT.LABEL," where the value of "1" in field 1420 indicates that the record 1442 refers to the annotation of record 1440.

A value of the annotation as defined in the declaration of the metadata model can be provided in a field 1422. The value in the field 1422 represents the explicitly defined value assigned to the annotation. An effective value assigned to the annotation can be indicated in a field 1424. For example, the annotation @Search.defaultSearchElement has the effective value "TRUE" even though this is not explicitly captured in the declaration of the metadata model but automatically derived from the annotation defaulting logic. Furthermore, in the example shown, the effective value for language dependent texts can be specified with respect to an identifier in a table 1450, where the value in the field 1424 corresponds to a value in a text identifier field 1454. The table 1450 is also shown as including a field 1456 that provides a code for a language associated with the text, and the actual text to be displayed can be provided in a field 1458.

The table 1400 can store information for all annotations that are incorporated into a particular metadata model. However, as described, some of the annotations may not be "active," in that, for instance, a locally declared annotation may overwrite an imported or referenced annotation. Similarly, in some cases annotations from multiple referenced sources (e.g., metadata models) may overlap or conflict, in which case only one (or, generally, a subset) of the annotations may be designated as active. It can be beneficial to separately maintain a repository of active annotations, which can be stored as shown in the table 1500 of FIG. 15.

The table 1500 can include a field 1504 for an object type, a field 1508 for an object name, a field 1510 for an object version identifier, a field 1512 for an entity name, a field 1514 for a subentity name, a field 1516 for an annotation internal identifier, a field 1518 for an annotation name, a field 1520 for a parent annotation identifier, a field 1522 for an annotation value, and a field 1524 for an effective annotation value, which fields can be implemented at least generally described for the similarly titled and numbered fields of the table 1400.

The table 1500 can include additional fields, such as an active annotation version identifier field 1530. Note that the active annotation version identifier in the field 1530 can have a value that is different than the object version identifier in the field 1510. For example, a new metadata extension could change the active annotation of an existing base (e.g., view) model version being annotated, so it may be useful to track the versions separately.

As annotations can be imported from other sources, it can be useful to track information about such annotations with respect to their source object (e.g., metadata model). Accordingly, a field 1532 can store the object type associated with the annotation (either the local object type or the object type of the object from which the annotation is being imported), while a field 1534 can store the name of the originating object. A field 1536 can store the version identifier of the originating object.

Example 11

Example API for Metadata Hub

Users or applications can access metadata models stored in a metadata hub, such as metadata maintained in one or more of the tabular formats described in Examples 7-10. In some cases, the information can be accessed via an API, such as a web-based API using REST services. In a particular example, the API can use the OData protocol.

Figure 16:
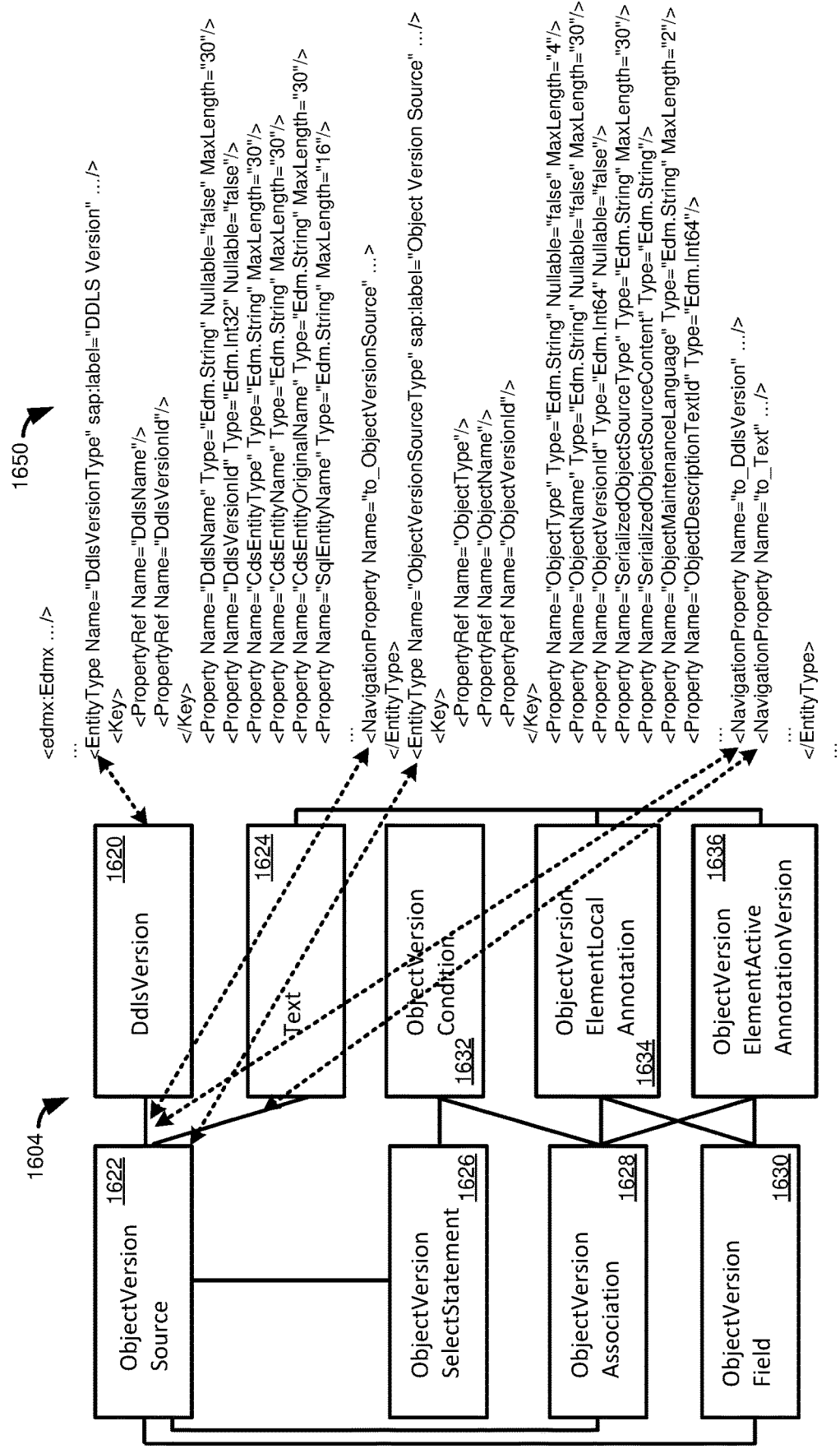
FIG. 16 illustrates code for a data access service that can access a persistency model for metadata models.

FIG. 16 illustrates an extract 1604 of a persistency model (e.g., all or a portion of the tables of Examples 7-10) and an extract 1650 of an OData service that can be used to access data maintained in the persistency, or determined or calculated from data in the persistency. The persistency extract 1604 can include tables, or portions thereof (e.g., one or more fields), for DDLS version information 1620, object version source information 1622, textual information 1624 (e.g., text of original metadata object definition information), select statement information 1626 associated with object versions, association information 1628 associated with object versions, field information 1630 associated with object versions, condition information 1632 associated with object versions (e.g., "where" or "on" conditions, such as described with respect to table 1032), local annotation information 1634 associated with object versions, and active annotation information 1636 associated with object versions.

An API, or other functionality for accessing services of a metadata hub, can provide functionality for, among other things, querying and maintaining representations of metadata models, such as to create, update, or delete metadata model representations (or specific versions thereof). The API can allow for other options, such as aggregating data from persisted metadata model representations or searching a metadata repository, including using fuzzy search techniques. For example, a user (or an application) might request information regarding how many objects are registered in a repository, how many versions are associated with a particular object, or a number of fields, such as a maximum number of fields, that an object may have.

FIG. 17 illustrates an example table 1704 having objection version source information, and an example table 1708 having DDLS version information. The table 1704 can have multiple fields, including a field 1712 for an object type associated with a record, a field 1714 for an object name associated with a record, and a field 1716 for an object version identifier associated with a record. The table 1708 can have a field 1720 for a DDLS name, a DDLS version field 1722, an entity name (such as a CDS entity name) field 1724, and an original entity name field (such as an original CDS entity name) field 1726.

Taking the metadata representations of tables 1704 and 1708 and using the extract 1650, a navigation property of the extract can be traversed to the DDLS version table 1708 from a record of the object version source table 1704 by an OData read request like:

. . . /sap/opu/odata/sap/CdsMetadataHub/ObjectVersion-Source(ObjectType='DDLS', ObjectName='I_SALESORDER',ObjectVersionId=1)/ to_DdlsVersion The operation results in the related data record:
<?xml version="1.0" encoding="UTF-8"?>. . .
<id>. . . /sap/opu/odata/sap/CdsMetadataHub/DdlsVersion (DdlsName='I_SALESORDER',DdlsVersionId=1)</id>.
. .
<content type="application/xml">
  <m:properties>
    <d:DdlsName>I_SALESORDER</d:DdlsName>
    <d:DdlsVersionId>1</d:DdlsVersionId>
    . . .
  </m:properties>
</content>. . .

The API can allow all related information for a given object version to be searched. For example, a search request for "cust" can have the form:
. . . /sap/opu/odata/sap/CdsMetadataHub/Ddls/?search=cust
Which retrieves all five records having the DDLS object name (e.g., field 1714) as I_CUSTOMER. Note that a user can retrieve and access metadata information without knowing the exact name of a metadata model or any of its constituent elements.

An API, or other metadata hub access functionality, can support other services, including services based on more coarse granular actions than just simply retrieving and updating metadata models. These services can include uploading object source information, comparing metadata models (and parts thereof), including comparing metadata models between different components or system versions. Analysis can be provided of where various metadata models, or elements, are used, including identifying dependencies between metadata models/metadata model components. Providing such services can be more efficient, and less error prone, than achieving the functionality every time through the application of multiple lower level functions.

As an example, for a request to upload a metadata model to the metadata hub, instead of converting object source information for each individual table starting with the object version table to tables storing more detailed information, a user or application can request an upload object action, which can supply an original string defining the object (e.g., the original SQL statement), optionally along with additional information, such as the type of the original source string (e.g., SQL, XML, plain text), the name of the object, the object type (e.g., view, table), other information, and combinations thereof. The input can include:
ObjectType
ObjectName
SerializedObjectSourceType
SerializedObjectSourceContent
ObjectMaintenanceLanguage
ObjectLastChangedDateTime
SoftwareComponentId
SoftwareComponentReleaseId
Based on the metadata hub can query the repository to determine whether a new version of the metadata model needs to be created, and, if so, can convert the uploaded model to a persistency format used by the metadata hub. In at least some cases, it can be determined whether any metadata models depend on the updated model and, if so, such dependent models can be updated to provide new model versions.

For a function that compares two metadata models, including two versions of a metadata model, information can be provided as to differences between the objects, how metadata models differ between different versions of a software component, or how metadata models differ between two versions of a system. Example input for comparing two versions of a metadata model can include:
ObjectType
ObjectName
ObjectVersion1Id
ObjectVersion2Id
ChangeTypes [e.g., change types to be queries, such as all, insert, update, delete, unchanged]
ComparisionScope [e.g., all elements of a metadata model, or only specified elements or sets of elements]
The comparison can return information including:
ObjectVersion
ChangeType
SubObjectType [e.g., field, association, parameter]
SubObjectName
PropertyType [e.g., active annotation, key, data type, name]
PropertyName
PropertyValue
The following can represent information in a request for changes in a metadata model:
Input:
ChangeTypes=INSERT
ComparisonScope=ALL
The response can include:
Output:
ObjectVersion=2
ChangeType=INSERT
SubObjectType=FIELD
SubObjectName=NewField
Thus, the comparison request reveals that a new field, NewField, was introduced in object version 2 of the metadata model.

A function of the metadata hub can be to return a list of objects where a particular metadata element is used. For example, a field may be initially defined for a particular table, but then may be referenced by multiple views. Input for this functionality can include:
Input:
ObjectType: Identification
ObjectName: Identification
ObjectVersionId: Identification
UseageTypes [e.g., ALL, association, target, data source, annotation)
MaximumNumberOfIndirections
The output of the request can include:
UsingObjectType
UsingObjectName
UsingObjectVersionId
UsageType
DirectlyUsedObjectType
DirectlyUsedObjectName
DirectlyUsedObjectName
DirectlyUsedObjectVersionId
NumberOfIndirections
FIG. 18 provides an example of a "where used" request. A group 1804 of related metadata models includes a metadata model 1808 for a View3 that references a metadata model 1810 for a View2, which references a metadata model 1812 for a View1, which in turn references a metadata model 1814 for a Table1. Assuming that each of the views, 1808, 1810, 1812 references a field of Table1, and that the views refer to this field through their referenced views as shown, a request could be:

Input:
ObjectName: TABLE1
UseageTypes: ALL
MaximumNumberOfIndirections: 5

In response to the request, the information shown in table 1830 could be provided, either in tabular form as shown, or in another format.

For a dependency check, input (e.g., arguments to the function) can include:
ObjectType
ObjectName
ObjectSourceType
ObjectSourceContent
SoftwareComponentVersions
NewSoftwareComponentVersions A response to the request (e.g., values returned by the function, such as in a structure (e.g., a C++ struct) or class instance, or another complex or abstract data type), can include:
MessageType [e.g., INFO, WARNING, ERROR]
MessageText
EntityReference [e.g., a link to additional details for the metadata model, so that additional information regarding dependent objects can be identified]

As a particular example, consider that a new annotation, NewAnnotation, is added to a field ViewField, which is exposed by a user model. Output for a dependency check can include:
MessageType: INFO
MessageText: A new annotation NewAnnotation was added to the field ViewField
EntityReference=. . . /sap/opu/odata/sap/CdsMetadataHub/. . . NewAnnotation. . .

The metadata hub can cause, or assist, in displaying metadata information to an end user, such on a user interface screen. The metadata hub can augment model metadata with additional information that can define the layout of the user interface, and can include or define additional services that allow a user to interact with the data. For example, annotations can be provided that assist a user in providing filter criteria via a value help, as shown in the example code of FIG. 19

Example 12

Example Implementations

FIG. 20 is a flowchart of an example method 2000 that can be carried out by a computing system that implements a metadata hub. In particular implementations, the operations can be carried out in the computing environment 100 of FIG. 1. At 2010, a first metadata model specified in a first format for a first database object is received. The first format includes a plurality of metadata elements, the plurality of metadata elements including at least one identifier of the first database object. A metadata repository is queried at 2014 to determine if a representation of the first database object exists in the metadata repository. At 2018, it is determined that the first database object having the at least one identifier does not exist in the metadata repository. The metadata model in the first format is parsed at 2022 to extract at least a portion of the plurality of metadata elements. A version identifier is assigned to a metadata model in a second format for the first database object at 2026. At 2030, the version identifier and the at least a portion of the metadata elements are stored in the second format, the second format being a relational format.

FIG. 21 is a flowchart of a method 2100 carried out by a metadata hub for comparing metadata models. In particular implementations, the method 2100 can be carried out in the computing environment 100 of FIG. 1. At 2110, a first definition of a first metadata model in a first format is received. The first definition of the first metadata model in the first format is parsed at 2114 to extract a first plurality of metadata elements. At 2118, a metadata repository is queried based at least in part on one of more metadata elements of the extracted first plurality of metadata elements. A second plurality of metadata elements are retrieved for one or more stored metadata models based on the query at 2122. At 2126, the second plurality of retrieved metadata elements are compared with the extracted first plurality of metadata elements to generate comparison results. The comparison results are returned in response to the request at 2130. The second metadata model is not stored in the metadata repository.

FIG. 22 is a flowchart of a method 2200 for identifying related database metadata models. In particular implementations, the method 2200 can be carried out in the computing environment 100 of FIG. 1. At 2210, a request is received to identify metadata models related to at least a first metadata model element specified in the request. A metadata repository is queried at 2214 using the at least a first metadata model element. The metadata repository includes a plurality of metadata models, at least a portion of the metadata models representing different versions of a given metadata model. At 2218, a plurality of metadata model versions for at least one metadata model stored in the metadata model repository that satisfy the query are determined. Identifiers for the plurality of metadata model versions are returned in response to the request at 2222.

Example 13

Computing Systems

Figure 23:
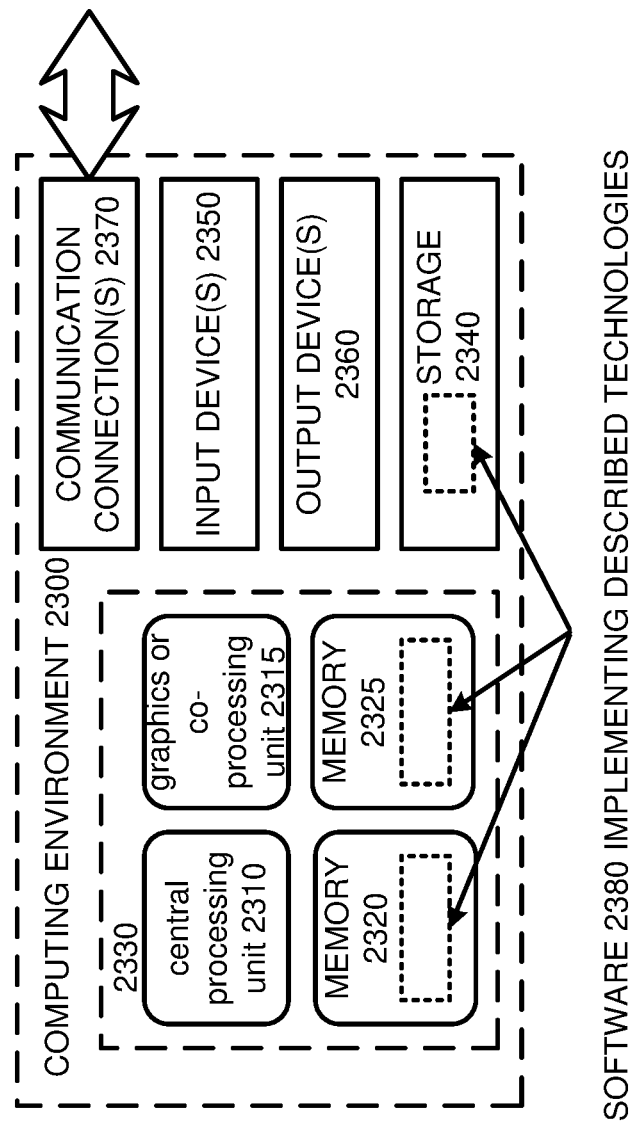
FIG. 23 is a diagram of an example computing system in which some described embodiments can be implemented.

FIG. 23 depicts a generalized example of a suitable computing system 2300 in which the described innovations may be implemented. The computing system 2300 is not intended to suggest any limitation as to scope of use or functionality of the present disclosure, as the innovations may be implemented in diverse general-purpose or special-purpose computing systems.

With reference to FIG. 23, the computing system 2300 includes one or more processing units 2310, 2315 and memory 2320, 2325. In FIG. 23, this basic configuration 2330 is included within a dashed line. The processing units 2310, 2315 execute computer-executable instructions, such as for implementing components of the environment 100 of FIG. 1, including as described in Examples 1-12. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 23 shows a central processing unit 2310 as well as a graphics processing unit or co-processing unit 2315. The tangible memory 2320, 2325 may be volatile memory (e.g., registers, cache, RAM), non-volatile memory (e.g., ROM, EEPROM, flash memory, etc.), or some combination of the two, accessible by the processing unit(s) 2310, 2315. The memory 2320, 2325 stores software 2380 implementing one or more innovations described herein, in the form of computer-executable instructions suitable for execution by the processing unit(s) 2310, 2315.

A computing system 2300 may have additional features. For example, the computing system 2300 includes storage 2340, one or more input devices 2350, one or more output devices 2360, and one or more communication connections 2370. An interconnection mechanism (not shown) such as a bus, controller, or network interconnects the components of the computing system 2300. Typically, operating system software (not shown) provides an operating environment for other software executing in the computing system 2300, and coordinates activities of the components of the computing system 2300.

The tangible storage 2340 may be removable or non-removable, and includes magnetic disks, magnetic tapes or cassettes, CD-ROMs, DVDs, or any other medium which can be used to store information in a non-transitory way and which can be accessed within the computing system 2300. The storage 2340 stores instructions for the software 2380 implementing one or more innovations described herein.

The input device(s) 2350 may be a touch input device such as a keyboard, mouse, pen, or trackball, a voice input device, a scanning device, or another device that provides input to the computing system 2300. The output device(s) 2360 may be a display, printer, speaker, CD-writer, or another device that provides output from the computing system 2300.

The communication connection(s) 2370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 14

Cloud Computing Environment

Figure 24:
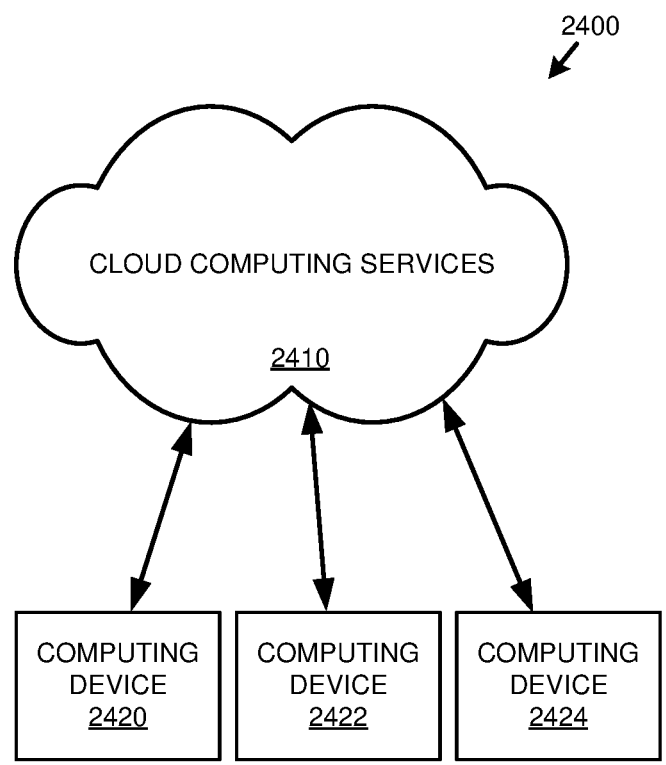
FIG. 24 is an example cloud computing environment that can be used in conjunction with the technologies described herein.

FIG. 24 depicts an example cloud computing environment 2400 in which the described technologies can be implemented. The cloud computing environment 2400 comprises cloud computing services 2410. The cloud computing services 2410 can comprise various types of cloud computing resources, such as computer servers, data storage repositories, networking resources, etc. The cloud computing services 2410 can be centrally located (e.g., provided by a data center of a business or organization) or distributed (e.g., provided by various computing resources located at different locations, such as different data centers and/or located in different cities or countries).

The cloud computing services 2410 are utilized by various types of computing devices (e.g., client computing devices), such as computing devices 2420, 2422, and 2424. For example, the computing devices (e.g., 2420, 2422, and 2424) can be computers (e.g., desktop or laptop computers), mobile devices (e.g., tablet computers or smart phones), or other types of computing devices. For example, the computing devices (e.g., 2420, 2422, and 2424) can utilize the cloud computing services 2410 to perform computing operators (e.g., data processing, data storage, and the like).

Example 15

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 23, computer-readable storage media include memory 2320 and 2325, and storage 2340. The term computer-readable storage media does not include signals and carrier waves. In addition, the term computer-readable storage media does not include communication connections (e.g., 2370).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C #, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
at least one memory;
at least one hardware processing unit coupled to the at least one memory; and
one or more non-transitory computer readable storage media storing instructions that, when executed, cause the computing system to perform operations comprising:
receiving a request for results of comparing respective definitions of two or more metadata model objects, the request comprising a first definition of a first metadata model object in a first format, the first definition comprising a first plurality of metadata elements;
parsing the first definition of the first metadata model object in the first format to extract at least a portion of the first plurality of metadata elements;
querying a metadata repository based at least in part on one or more metadata elements of the at least a portion of the first plurality of metadata elements;
retrieving a second plurality of metadata elements for respective definitions of one or more stored metadata model objects based on the query;
comparing the second plurality of retrieved metadata elements with the extracted at least a portion of the first plurality of metadata elements to generate comparison results, wherein the comparison results comprise an indication that a definition of a metadata model object of the one or more stored metadata model objects comprises a metadata element that has been added, removed, or changed compared with the first plurality of metadata elements; and
returning the comparison results in response to the request.

2. The computing system of claim 1, wherein the comparison results comprise an indication that a definition of a metadata model of the one or more stored metadata models comprises a metadata element that has been added, removed, or changed compared with the first plurality of metadata elements.

3. The computing system of claim 1, wherein the comparison results comprise one or more metadata elements, wherein the one or more metadata elements represent metadata elements that have been added, removed, or changed compared with the first plurality of metadata elements, the method further comprising:
creating a new version of a metadata model object definition of the one or more stored metadata model objects.

4. The computing system of claim 3, the operations further comprising:
linking the new version of the metadata model object definition to a prior version of the metadata model object definition.

5. The computing system of claim 3, the operations further comprising:
linking a metadata element of the one or more metadata elements to a prior version of the metadata element.

6. The computing system of claim 1, the operations further comprising:

based at least in part on the comparing, determining that at least one metadata element of the first metadata model object definition is not present in the metadata repository; and storing the at least one element of the first metadata model object definition in the metadata repository.

7. The computing system of claim 1, wherein the first metadata model object definition is not stored in the metadata repository at a time of the receiving the request.

8. The computing system of claim 1, wherein the metadata repository is accessible to a plurality of remote computing systems.

9. A method, implemented in a computing system comprising at least one memory and at least one hardware processing unit coupled to the at least one memory, the method comprising:

receiving a request for results of comparing respective definitions of two or more metadata model objects, the request comprising a first definition of a first metadata model object in a first format, the first definition comprising a first plurality of metadata elements;

parsing the first definition of the first metadata model object in the first format to extract at least a portion of the first plurality of metadata elements;

querying a metadata repository based at least in part on one or more metadata elements of the at least a portion of the first plurality of metadata elements;

retrieving a second plurality of metadata elements for respective definitions of one or more stored metadata model objects based on the query;

comparing the second plurality of retrieved metadata elements with the extracted at least a portion of the first plurality of metadata elements to generate comparison results, wherein the comparison results comprise an indication that a definition of a metadata model object of the one or more stored metadata model objects comprises a metadata element that has been added, removed, or changed compared with the first plurality of metadata elements; and returning the comparison results in response to the request.

10. The method of claim 9, wherein the comparison results comprise an indication that a definition of a metadata model of the one or more stored metadata models comprises a metadata element that has been added, removed, or changed compared with the first plurality of metadata elements.

11. The method of claim 9, wherein the comparison results comprise one or more metadata elements, wherein the one or more metadata elements represent metadata elements that have been added, removed, or changed compared with the first plurality of metadata elements, the method further comprising:

creating a new version of a metadata model object definition of the one or more stored metadata model objects.

12. The method of claim 11, further comprising:

linking the new version of the metadata model object definition to a prior version of the metadata model object definition.

13. The method of claim 11, further comprising:

linking a metadata element of the one or more metadata elements to a prior version of the metadata element.

14. The method of claim 9, further comprising:

based at least in part on the comparing, determining that at least one metadata element of the first metadata model object definition is not present in the metadata repository; and storing the at least one element of the first metadata model object definition in the metadata repository.

15. The method of claim 9, wherein the first metadata model object definition is not stored in the metadata repository at a time of the receiving the request.

16. The method of claim 9, wherein the metadata repository is accessible to a plurality of remote computing systems.

17. One or more computer-readable storage media comprising:

computer-executable instructions that, when executed by a computing system comprising at least one memory and at least one hardware processor coupled to the at least one memory, cause the computing system to receive a request for results of comparing respective definitions of two or more metadata model objects, the request comprising a first definition of a first metadata model object in a first format, the first definition comprising a first plurality of metadata elements;

computer-executable instructions that, when executed by the computing system, cause the computing system to parse the first definition of the first metadata model object in the first format to extract at least a portion of the first plurality of metadata elements;

computer-executable instructions that, when executed by the computing system, cause the computing system to query a metadata repository based at least in part on one or more metadata elements of the at least a portion of the first plurality of metadata elements;

computer-executable instructions that, when executed by the computing system, cause the computing system to retrieve a second plurality of metadata elements for respective definitions of one or more stored metadata model objects based on the query;

computer-executable instructions that, when executed by the computing system, cause the computing system to compare the second plurality of retrieved metadata elements with the extracted at least a portion of the first plurality of metadata elements to generate comparison results, wherein the comparison results comprise an indication that a definition of a metadata model object of the one or more stored metadata model objects comprises a metadata element that has been added, removed, or changed compared with the first plurality of metadata elements; and computer-executable instructions that, when executed by the computing system, cause the computing system to return the comparison results in response to the request.

18. The one or more computer-readable storage media of claim 17, wherein the comparison results comprise an indication that a definition of a metadata model of the one or more stored metadata models comprises a metadata element that has been added, removed, or changed compared with the first plurality of metadata elements.

19. The one or more computer-readable storage media of claim 17, wherein the comparison results comprise one or more metadata elements, wherein the one or more metadata elements represent metadata elements that have been added, removed, or changed compared with the first plurality of metadata elements, the method further comprising:

creating a new version of a metadata model object definition of the one or more stored metadata model objects.

20. The one or more computer-readable storage media of claim 19, further comprising:

computer-executable instructions that, when executed by the computing system, cause the computing system to link the new version of the metadata model object definition to a prior version of the metadata model object definition.

* * * * *